United States Patent [19]

Shimizu et al.

[11] Patent Number: 5,889,103
[45] Date of Patent: Mar. 30, 1999

[54] POLYMER SCALE PREVENTIVE AGENT COMPRISING A CONDENSATION PRODUCT OF A QUINONE COMPOUND

[75] Inventors: Toshihide Shimizu, Urayasu; Mikio Watanabe, Kamisu-machi, both of Japan

[73] Assignee: Shin-Etsu Chemical Co., Ltd., Tokyo, Japan

[21] Appl. No.: 954,746

[22] Filed: Oct. 20, 1997

Related U.S. Application Data

[60] Continuation of Ser. No. 484,842, Jun. 7, 1995, abandoned, which is a division of Ser. No. 259,062, Jun. 13, 1994, Pat. No. 5,691,428.

[30] Foreign Application Priority Data

| Jun. 15, 1993 | [JP] | Japan | 5-168528 |
| Dec. 24, 1993 | [JP] | Japan | 5-347433 |
| Feb. 10, 1994 | [JP] | Japan | 6-037708 |
| Feb. 15, 1994 | [JP] | Japan | 6-040472 |
| Feb. 15, 1994 | [JP] | Japan | 6-040473 |

[51] Int. Cl.$^6$ ................................................ C08K 3/00
[52] U.S. Cl. .................. 524/498; 252/80; 524/548; 524/557; 524/592; 524/704; 524/734
[58] Field of Search ................... 524/548, 557, 524/592, 498, 704, 734

[56] References Cited

U.S. PATENT DOCUMENTS

| 4,080,173 | 3/1978 | Cohen . | |
| 5,241,022 | 8/1993 | Watanabe et al. . | |
| 5,352,748 | 10/1994 | Shimizu | 526/62 |
| 5,399,613 | 3/1995 | Shimizu | 524/540 |

FOREIGN PATENT DOCUMENTS

| A0165338 | 12/1985 | European Pat. Off. . |
| A0540934 | 5/1993 | European Pat. Off. . |
| A0557120 | 8/1993 | European Pat. Off. . |
| A0574197 | 12/1993 | European Pat. Off. . |
| A4154801 | 5/1992 | Japan . |
| A4154802 | 5/1992 | Japan . |

*Primary Examiner*—Christopher Henderson
*Attorney, Agent, or Firm*—Sughrue, Mion, Zinn, Macpeak & Seas, PLLC

[57] ABSTRACT

A polymer scale preventive agent for use in polymerization of a monomer having an ethylenically unsaturated double bond, comprising an alkaline solution containing (A) a condensation product having a molecular weight of 400 to 50,000 obtained by condensing a quinone compound. This agent is applied to the inner wall surfaces of a polymerization vessel, and dried to form a coating. Such a vessel is effective in preventing polymer scale deposition, not only on the areas located in the liquid-phase region but also on the areas around the interface between the gas and liquid phases in the vessel, and is useful in producing a polymer that shows few fish eyes and good whiteness when formed into sheets or the like.

14 Claims, No Drawings

POLYMER SCALE PREVENTIVE AGENT COMPRISING A CONDENSATION PRODUCT OF A QUINONE COMPOUND

This is a Continuation of application Ser. No. 08/484,842, filed Jun. 7, 1995 now abandoned, and Divisional application Ser. No. 08/259,062 filed Jun. 13, 1994, now U.S. Pat. No. 5,691,428.

BACKGROUND OF THE INVENTION

1. Field of the Invention

The present invention relates to a polymer scale preventive agent for use in polymerization of a monomer having an ethylenically unsaturated double bond, and a process for producing a polymer using the same.

2. Description of the Prior Art

Heretofore, methods for polymerization of a monomer having an ethylenically unsaturated double bond have been known, such as suspension, emulsion, solution, gas phase and bulk polymerization processes and the like. In any of these polymerization processes, polymer scale is liable to be deposited on the areas with which the monomer comes into contact, such as inner walls, stirring equipment and so on of a polymerization vessel.

The deposition of the polymer scale results in disadvantages in that the yield of the polymer and cooling capacity of the polymerization vessel are lowered, and that the polymer scale may peel off and mix into a polymeric product, thereby impairing the quality of formed products obtained by processing the polymeric product. In addition, removal of deposited polymer scale is very laborious and time-consuming. Further, the polymer scale contains unreacted monomers and, therefore, may cause physical disorders in the operators, which has been a very serious problem in recent years.

For preventing polymer scale deposition on the polymerization vessel inner wall and so forth, methods have been known, for example, a method in which a polymer scale preventive agent comprising a polar organic compound such as an amine compound, a quinone compound, an aldehyde compound, etc., is applied to the polymerization vessel inner wall and so on to form a coating and a method in which such compounds are added to an aqueous medium (Japanese Patent Publication (KOKOKU) No. 45-30343, is practiced in some instances of suspension polymerization of vinyl chloride.

However, these methods have the disadvantage that, although the polymer scale preventive effect is exhibited while polymerization is repeated for up to about 5 or 6 batches, the effect diminishes if the number of repeated batches of polymerization exceeds 5 or 6 (that is, the scale preventive effect is poor in durability). The disadvantage is emphasized particularly where a water-soluble catalyst is used for polymerization, and, in this point, the polymer scale prevention according to these methods is unsatisfactory industrially.

For overcoming the above disadvantage, Japanese Preexamination Patent Publication (KOKAI) No. 53-13689 proposes a method in which the inner wall, etc., of a polymerization vessel is coated with a polymer scale preventive agent comprising a condensation product of an aromatic amine compound as an effective constituent. Where the polymer scale preventive agent is applied to the areas with which monomers come into contact, such as the inner wall surface of a polymerization vessel, and a coating is thereby formed, it is possible to repeat about 100 to 200 batches of polymerization without causing deposition of polymer scale on the areas located in the liquid-phase region inside the polymerization vessel. Besides, even in the above-mentioned case where a water-soluble catalyst is used, deposition of polymer scale in the liquid-phase region is similarly prevented.

However, after the coating of the polymer scale preventive agent comprising a condensation product of an aromatic amine compound as its effective constituent is formed, there still remains a drawback that polymer scale deposition may occur on the areas around the interface between the liquid phase and the gas phase located at an upper portion of the interior of the polymerization vessel.

Once polymer scale deposition occurs on the areas around the interface between the gas and liquid phases, the deposited scale will grow gradually as polymerization runs are repeated, and at last it may peel off to be incorporated into the polymeric product. If the polymeric product with the polymer scale thus mixed therein is processed into formed products such as sheets or the like, the polymer scale causes generation of many fish eyes in the formed products, thereby lowering seriously the quality of the formed products.

Besides, the polymeric product obtained upon polymerization is required to have a high whiteness. That is, when a polymeric product is formed into a sheet or the like without any addition of a coloring agent, the resulting formed product is more or less colored and such coloration, called initial coloration, is desired to be as slight as possible. However, the aforesaid coating of the polymer scale preventive agent which contains a condensation product of an aromatic amine compound may peel off or dissolve in the polymerization mass, to be incorporated into the polymeric product; in such a case, the resulting formed products will have a lowered whiteness, i.e., a higher initial coloration.

SUMMARY OF THE INVENTION

Accordingly it is an object of the present invention to provide a polymer scale preventive agent for use in polymerization of a monomer having an ethylenically unsaturated double bond that can prevent effectively the deposition of polymer scale, not only on the areas in the liquid-phase region but also on the areas around the interface between the gas and liquid phases inside a polymerization vessel, and that makes it possible to produce a polymer having a very small number of fish eyes and slight initial coloration when processed into formed products such as sheets or the like; and a process for producing a polymer using the polymer scale preventive agent.

The present invention provides, as a means of achieving the above object, a polymer scale preventive agent for use in polymerization of a monomer having an ethylenically unsaturated double bond, comprising an alkaline solution containing:

(A) a condensation product having a molecular weight of 400 to 50,000 obtained by condensing a quinone compound.

Also, the present invention provides a process for producing a polymer of a monomer having an ethylenically unsaturated double bond, which comprises polymerizing the monomer in a polymerization vessel having a coating on its inner wall surfaces, whereby polymer scale is prevented from being deposited, wherein said coating has been formed by applying an alkaline solution containing:

(A) a condensation product having a molecular weight of 400 to 50,000 obtained by condensing a quinone compound, and drying said applied solution.

According to the present invention, deposition of polymer scale in a polymerization vessel can be effectively prevented, not only on the areas in the liquid-phase region but also on the areas around the interface between the gas phase and the liquid phase.

Therefore, where polymerization is conducted by applying the present invention, the operation of removing polymer scale need not be performed every run of polymerization, and productivity is thereby improved.

In addition, the polymer obtained by application of the present invention can be processed into formed products such as sheets or the like which have very few fish eyes.

Furthermore, the formed products have good quality in regard of initial coloration. More specifically, the formed products have a luminosity index (L value) in the Hunter's color difference equation described in JIS Z 8730 (1980) of, for example, 70 or more in the case of vinyl chloride polymers and 80 or more in the case of SBR.

DETAILED DESCRIPTION OF PREFERRED EMBODIMENTS

Component (A)

Quinone compound

The quinone compound includes, for example, the benzoquinone compounds of the following general formulas (1) and (2):

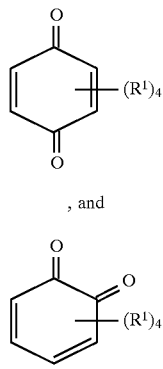

wherein in the formulas (1) and (2), ($R^1$)'s may be the same or different and are each —H, —$NH_2$, —Cl, —Br, —OH, —$NO_2$, —$COCH_3$, —$OCH_3$, —$N(CH_3)_2$, —COOH, —$SO_3H$ or an alkyl group having 1 to 3 carbon atoms; and the naphthoquinone compounds of the following general formulas (3) and (4):

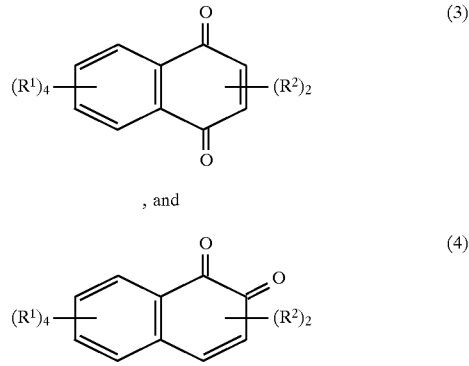

wherein in the formulas (3) and (4), ($R^1$)'s may be the same or different and are each as defined above, and ($R^2$)'s may be the same or different and are each —H, —Cl, —Br, —OH, —$COCH_3$, —$OCH_3$, —$CH_3$, —COOH or —$SO_3H$.

Specifically, examples of the benzoquinone compounds of the general formulae (1) and (2) include o- and p-benzoquinones, hydroxy-p-benzoquinone, chloro-p-benzoquinone, bromo-p-benzoquinone, duroquinone, chloranil and the like.

Specific examples of the naphthoquinone compounds of the general formulae (3) and (4) include 6-methyl-1,4-naphthoquinone, 2-methyl-1,4-naphthoquinone, lawsone, juglone, plumbagin, α-naphthoquinone, β-naphthoquinone and the like.

Among the quinone compounds above, preferred are o- and p-benzoquinones, α-naphthoquinone, β-naphthoquinone and lawsone.

These quinone compounds may be used either singly or in a combination of two or more thereof.

Production of condensation product of quinone compound

The component (A), an essential constituent of the polymer scale preventive agent according to the present invention, is a condensation product having a molecular weight of 400 to 50,000, preferably 600 to 20,000, which can be obtained by condensing the above-described quinone compound. If the molecular weight is less than 400, the resulting polymer scale-preventing effect is low. If the molecular weight exceeds 50,000, on the other hand, the solubility of the condensation product in water and in organic solvents is lowered, so that a uniform polymer scale preventive agent cannot be prepared and the scale preventing effect is lowered.

The above-described condensation product can be produced, for example, by reacting the above quinone compound in a solvent, normally at 20° to 200° C., preferably at 80° to 150° C., the reaction time being normally 2 to 200 hours. In the reaction, the concentration of the quinone compound in the solvent preferably ranges from 0.5 to 25% by weight, more preferably from 1 to 20% by weight.

The condensation reaction is preferably carried out in the presence of an alkaline compound, in order to accelerate the reaction. In the presence of the alkaline compound, the reaction may be normally carried out at 20° to 150° C., preferably 25° to 100° C. The reaction time then is normally on the order of 1 to 100 hours, preferably 7 to 70 hours. Such an alkaline compound is preferably used in an amount of 0.01 to 100 parts by weight, more preferably 0.1 to 40 parts by weight, per 100 parts by weight of the quinone compound. The alkaline compound includes, for example, alkali metal hydroxides such as LiOH, NaOH, KOH and the like.

Furthermore, in the above condensation reaction, an oxidizing agent may be used, as required. The oxidizing agents which can be used include, for example, elemental and molecular halogens such as iodine, bromine and fluorine; oxyacids and their salts, such as iodic acid, periodic acid, potassium periodate and sodium perchlorate; inorganic peroxides such as hydrogen peroxide, sodium peroxide, potassium persulfate, and ammonium persulfate; organic peroxides such as peracetic acid, benzoyl peroxide, cumene hydroperoxide, perbenzoic acid and p-menthane hydroperoxide; chlorides and sulfates of a metal selected from the group consisting of iron and copper, such as ferrous chloride, ferric chloride, copper sulfate and cuprous chloride; azo compounds such as α,α'-azobisisobutyronitrile and α,α'-azobis-2,4-dimethylvaleronitrile; and aromatic nitro compounds such as nitrobenzene, o-, m- and p-hydroxynitrobenzenes, o-, m- and p-nitroanisoles, o-, m- and p-chlorobenzenes, o-, m- and p-nitrobenzenesulfonic acids, etc.

The solvents for the condensation reaction include organic solvents such as, e.g., alcohols, ketones and esters, among which organic solvents compatible with water are preferred. The organic solvents compatible with water include, for example, alcohols such as methanol, ethanol and propanol, ketones such as acetone, methyl ethyl ketone, and the like, and esters such as methyl acetate and ethyl acetate, out of which alcohols are particularly preferred. Mixed solvents of water and an organic solvent compatible with water can be also used.

It is preferable that the polymer scale preventive agent of the present invention further comprises:

(B) at least one member selected from the group consisting of (b-1) an aromatic amine compound, (b-2) an aliphatic diamine compound, (b-3) a reducing agent, (b-4) an aromatic hydroxyl compound, and (b-5) an aromatic hydroxyl compound-based condensate.

Incorporation of the component (B) into the polymer scale preventive agent improves the polymer scale-preventing effect of the agent.

Component (B)

(b-1) Aromatic amine compound

The aromatic amine compound (b-i) includes, for example, the compounds of the following general formulas (5) to (8):

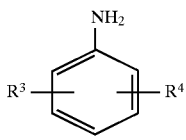

wherein $R^3$ is —H, —NH$_2$, —Cl, —OH, —NO$_2$, —COCH$_3$, —OCH$_3$, —N(CH$_3$)$_2$ or an alkyl group having 1 to 3 carbon atoms, and $R^4$ is —H, —NH$_2$, —OH, —CH$_3$, —COOH or —SO$_3$H;

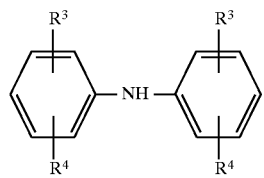

wherein ($R^3$)'s may be the same or different and are each as defined above, and ($R^4$)'s may be the or different and are each as defined above;

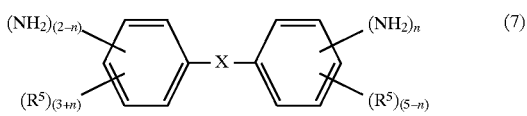

wherein ($R^5$)'s may be the same or different and are each —H, —OH, —COOH, —SO$_3$H, —NH$_2$, —Cl, —NO$_2$, —COCH$_3$, —OCH$_3$, —N(CH$_3$)$_2$ or an alkyl group having 1 to 3 carbon atoms, X is an alkylene group having 1 to 5 carbon atoms, —N(CH$_3$)—, —C(CH$_3$)$_2$—, —CONH—, —P(=O)H—, —SO$_2$—, —O—, —S— or —Si(R)$_2$— (where R is an alkyl group having 1 to 10 carbon atoms), and n is an integer of 1 or 2; and

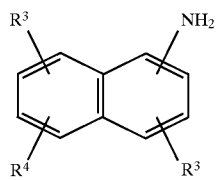

wherein ($R^3$)'s may be the same or different and are each as defined above, and $R^4$ is as defined above.

Specifically, the compounds of the above general formula (5) include, for example, aniline, o-, m- and p-phenylenediamines, o-, m- and p-aminophenols, o-, m- and p-chloroanilines, o-, m- and p-nitroanilines, o-, m- and p-methylanilines, N,N-dimethyl-p-phenylenediamine, 4-chloro-o-phenylenediamine, 4-methoxy-o-phenylenediamine, 2-amino-4-chlorophenol, 2,3-diaminotoluene, 5-nitro-2-aminophenol, 2-nitro-4-aminophenol, 4-nitro-2-aminophenyl, o-, m- and p-aminosalicylic acids, o-, m- and p-aminobenzoic acids, 2,4-and 3,5-diaminobenzoic acids, o-, m- and p-aminobenzenesulfonic acids, 2,4-diaminobenzenesulfonic acid and the like. Among these, preferred are o-, m- and p-aminophenols, aniline, 4-methoxy-o-phenylenediamine, 5-nitro-2-aminophenol, 2-nitro-4-aminophenol, o-, m- and p-aminosalicylic acids, p-aminobenzenesulfonic acid, and 2,4-diaminobenzenesulfonic acid.

Specific examples of the compounds of the above general formula (6) include 4-aminodiphenylamine, 2-aminodiphenylamine, 4,4'-diaminodiphenylamine, 4-amino-3'-methoxydiphenylamine, 4-amino-4'-hydroxydiphenylamine and the like. Among these, preferred are 4-aminodiphenylamine, 2-aminodiphenylamine, and 4,4'-diaminodiphenylamine.

Specific examples of the diphenyl compounds having at least two amino groups (—NH$_2$) represented by the above general formula (7) include 4,4'-diaminodiphenyl sulfide, 4,4'-diaminodiphenyl ether, 4,4'-diaminodiphenylpropane, 4,4'-diaminodiphenyl sulfone, bis(4-aminophenyl) diethylsilane, bis(4-aminophenyl)phosphine oxide, bis(4-aminophenyl)-N-methylamine, 4,4'-diaminobenzanilide, 4,4'-diaminodiphenylmethane and the like. Among these, preferred are 4,4'-diaminodiphenyl sulfone, 4,4'-diaminobenzanilide, 4,4'-diaminodiphenyl ether, 4,4'-diaminodiphenylmethane, and 4,4'-diaminodiphenyl sulfide.

Specific examples of the compounds of the above general formula (8) include α-naphthylamine, β-naphthylamine, 1,5-diaminonaphthalene, 1-amino-5-hydroxynaphthalene, 1,8-diaminonaphthalene, 2,3-diaminonaphthalene and the like. Among these, preferred are α-naphthylamine, 1,5-diaminonaphthalene, and 1,8-diaminonaphthalene.

The aromatic amine compounds (b-1) may be used either singly or in a combination of two or more thereof.

(b-2) Aliphatic diamine compound

The aliphatic diamine compound (b-2) includes, for example, diaminoalkanes, diaminocycloalkanes, diaminodialkylamines, diaminodialkyl sulfides and the like which have two primary amino groups (—NH$_2$), as well as a piperazines and the like.

As the diaminoalkanes, preferred are those having 2 to 12 carbon atoms. Typical examples include 1,2-diaminoethane, 1,2-diaminopropane, 1,3-diaminopropane, 1,4-diamnobutane, 1,7-diaminoheptane, 1,6-diaminohexane, 1,8-diaminooctane, 9,10-diaminononane, 1,10-diaminodecane, 1,12-diaminododecane, 1,2-diamino-2-methylpropane and the like. The compounds derived from these diaminoalkanes by substitution of at least one of carbon-bonded hydrogen atoms with substituent groups such as a hydroxyl group may also be used. Specific examples include 1,3-diamino-2-hydroxypropane and the like.

As the diaminocycloalkanes, preferred are those having 5 to 13 carbon atoms, for example, 1,4-diaminocyclohexane, bis(4-aminocyclohexyl)methane and the like. The compounds derived from these diaminocycloalkanes by substitution of at least one of the carbon-bonded hydrogen atoms with substituent groups such as a hydroxyl group may also be used, for example, 1,4-diamino-2-hydroxycyclohexane and the like.

The diaminodialkylamines are compounds having the following general formula (9):

$$NH_2-C_iH_{2i}-NR^6-C_jH_{2j}-NH_2 \quad (9)$$

wherein i and j may be the same or different from each other and are each an integer of 1 to 6, and $R^6$ is —H or an alkyl group having 1 to 6 carbon atoms. Specific examples include bis(3-aminopropyl)amine, bis(3-aminopropyl)methylamine, bis(5-aminoheptyl)methylamine and the like.

The diaminodialkyl sulfides are compounds having the following general formula (10):

$$NH_2-C_iH_{2i}-S-C_jH_{2j}-NH_2 \quad (10)$$

wherein i and j may be the same or different from each other and are each as defined above. Specific examples include bis(3-aminopropyl) sulfide, bis(5-aminoheptyl) sulfide and the like.

Among the aliphatic diamine compounds (b-2) above, preferred are 1,2-diaminoethane, 1,2-diaminopropane, 1,3-diaminopropane, 1,4-diaminobutane, 1,3-diamino-2-hydroxypropane, and piperazine.

The aliphatic diamine compounds (b-2) may be used either singly or in a combination of two or more thereof.

(b-3) Reducing agent

The reducing agent (b-3) functions to stop the condensation reaction in the condensation product of the quinone compound described above. Presumably, therefore, this action of the reducing agent stabilizes the polymer scale preventive agent, thereby improving the polymer scale-preventing effect of the preventive agent. Besides, the reducing agent (b-3) itself has a polymer scale-preventing effect, so that the addition of the component (b-3) increases the scale-preventing effect. The mechanism through which the component (b-3) is effective in preventing polymer scale deposition is not clearly known. Presumably, the component (b-3) has an effect by which radicals or the like generated in a polymerization reaction are prevented from being adsorbed on wall surfaces.

The reducing agent (b-3) includes, for example, hydrogen; hydrides such as hydrogen iodide, hydrogen bromide, lithium aluminum hydride, sodium borohydride, calcium borohydride, zinc borohydride, tetraalkylammonium borohydride, trichlorosilane, triethylsilane, and the like; lower oxides and lower oxyacids, such as carbon monoxide, sulfur dioxide, sodium thiosulfate, sodium thiosulfite, sodium sulfite, potassium sulfite, sodium bisulfite, and sodium hydrosulfite; sulfur compounds such as Rongalit, sodium sulfide, sodium polysulfide, and ammonium sulfide; metals that are electrically highly positive such as alkali metals (such as sodium and lithium), magnesium, calcium, aluminum and zinc and their amalgams; salts of metals in a lower valence state such as iron(II) sulfate, tin(II) chloride, titanium(III) trichloride, and the like; phosphorus compounds such as phosphorus trichloride, phosphorus triiodide, trimethylphosphine, triphenylphosphine, trimethylphosphite, and hexamethylphosphorus triamide; hydrazine; diborane, and substituted boranes such as ethane-1,2-diaminoborane, dimethylamine-borane, and pyridine-borane.

Among the reducing agents (b-3) above, preferred are hydrogen iodide, hydrogen bromide, sodium borohydride, sulfur dioxide, sodium thiosulfate, sodium thiosulfite, sodium sulfite, potassium sulfite, sodium bisulfite, sodium hydrosulfite and Rongalit.

The reducing agents (b-3) may be used either singly or in a combination of two or more thereof.

(b-4) Aromatic hydroxyl compound

The aromatic hydroxyl compound (b-4) has a suppressing effect on the condensation reaction in forming the condensation product of the quinone compound described above. Presumably, therefore, the polymer scale preventive agent is stabilized by the action of the component (b-4), and the polymer scale-preventing effect is improved accordingly.

In the polymer scale preventive agent, the component (A) and the component (b-4) may, in part or entirely, undergo an addition reaction to form an addition reaction product such as quinhydrone or the like.

The aromatic hydroxyl compound of component (B) includes, for example, the compounds of the following general formulas (11) and (12):

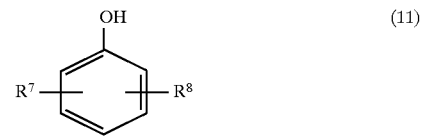

wherein $R^7$ is —H, —Cl, —OH, —COCH$_3$, —OCH$_3$, —COOH, —SO$_3$H or an alkyl group having 1 to 3 carbon atoms, and $R^8$ is —H, —Cl, —OH, —OCH$_3$, —OC$_2$H$_5$ or —COOH; and

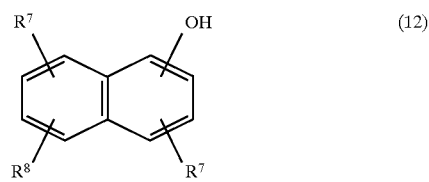

wherein ($R^7$)'s may be the same or different and are each as defined above, and $R^8$ is as defined above.

Specifically, the compounds of the above general formula (11) include, for example, phenol, hydroquinone, resorcinol, catechol, hydroxyhydroquinone, pyrogallol, o-, m- and p-chlorophenols, o-, m- and p-hydroxybenzoic acids, 2,4-, 2,5-, 2,6-, 3,4- and 3,5-dihydroxybenzoic acids, 2,5-, 2,6- and 3,5-dihydroxytoluene and the like. Among these, preferred are pyrogallol, resorcinol and hydroxyhydroquinone.

Specific examples of the compounds of the above general formula (12) include α-naphthol, β-naphthol, 1,3-, 1,4-, 1,5-, 2,3-, 2,6- and 2,7-dihydroxynaphthalene, 1-hydroxy-2-naphthoic acid, 3-hydroxy-2-naphthoic acid and the like. Among these, preferred are 2,7-dihydroxynaphthalene and α-naphthol.

The aromatic hydroxyl compounds (b-4) may be used either singly or in a combination of two or more thereof.

(b-5) Aromatic hydroxyl compound-based condensate

The aromatic hydroxyl compound-based condensate (b-5) is a condensation product essentially comprising an aromatic hydroxyl compound described as the compound (c-4) above as a condensation reactant, and includes, for example, condensation products of an aromatic hydroxyl compound alone; condensation products of an aromatic hydroxyl compound with other compounds such as, for example, acetone, aldehydes and aromatic amine compounds; and natural aromatic hydroxyl-containing organic compounds.

(I) Condensates of aromatic hydroxyl compound alone

The condensate of an aromatic hydroxyl compound alone can be obtained by reacting an aromatic hydroxyl compound in the presence of a catalyst such as a peroxide, azo compound, nitro compound, halogen compound, quinone or metallic salt at a temperature of about room temperature to 100° C. in water, an organic solvent such as alcohols, ketones, and esters, or a mixed solvent of water and an organic solvent mentioned above. Specifically, the catalyst used includes, for example, peroxides such as periodic acid, potassium periodate and hydrogen peroxide; azo compounds such as α,α'-azobisisobutyronitrile; halogen compounds such as hydrochloric acid, hydrofluoric acid and tetrafluoroboric acid; aromatic nitro compounds such as nitrobenzene; aromatic quinone compounds such as p-benzoquinone; and metallic salts such as ferric chloride.

Typical examples of the condensates of an aromatic hydroxyl compound alone include individual condensates of pyrogallol, resorcinol, catechol or 2,7-dihydroxynaphthalene.

(II) Aromatic hydroxyl compound-acetone condensate

The condensate of an aromatic hydroxyl compound with acetone can be obtained by dissolving an aromatic hydroxyl compound in acetone, and reacting them in the presence of a catalyst at a temperature of about room temperature to 100° C. As the catalyst, phosphorus oxychloride is used, for instance.

Typically, the condensates of aromatic hydroxyl compound with acetone include pyrogallol-acetone condensates, resorcinol-acetone condensates, 2,7-dihydroxynaphthalene-acetone condensates, 1,5-dihydroxynaphthalene-acetone condensates, 2,6-dihydroxynaphthalene-acetone condensates, 2,3-dihydroxynaphthalene-acetone condensates, and the like.

(III) Aromatic hydroxyl compound-aldehyde condensate

The condensate of an aromatic hydroxyl compound with aldehyde can be obtained by reacting an aromatic hydroxyl compound and an aldehyde in the presence of a catalyst in an aqueous or alcoholic solvent around room temperature to about 200° C. The catalyst includes, for example, acidic substances such as phosphoric acid and hydrochloric acid, and alkaline substances such as sodium hydroxide, potassium hydroxide and ammonia.

The aldehyde used as one of the reactants includes, for example, formaldehyde, acetaldehyde, glyoxal, glutaric aldehyde, benzaldehyde and the like.

Typically, the condensates of an aromatic hydroxyl compound with aldehyde include, for example, the condensates of formaldehyde with phenol, hydroquinone, catechol, pyrogallol, 2,7-dihydroxynaphthalene, 1,5-dihydroxynaphthalene, or 1,4,5,8-tetrahydroxynaphthalene, the condensates of benzaldehyde with pyrogallol, phenol, 2,3-dihydroxynaphthalene, catechol, 2,7-dihydroxynaphthalene, 1,4,5,8-tetrahydroxynaphthalene or 1,5-dihydroxynaphthalene, and so forth.

(IV) Aromatic hydroxyl compound-aromatic amine compound condensates

The condensate of an aromatic hydroxyl compound with aromatic amine compound can be obtained by reacting an aromatic hydroxyl compound and an aromatic amine compound at a temperature of about room temperature to about 200° C. in the presence of a catalyst in water, an organic solvent such as alcohols, ketones and esters, or a mixed solvent of water and an organic solvent mentioned above. The catalyst used includes, for example, peroxides such as periodic acid, potassium periodate and hydrogen peroxide; azo compounds such as α,α'-azobisisobutyronitrile; metallic salts such as ferric chloride; aromatic nitro compounds such as nitrobenzene; and aromatic quinone compounds such as p-benzoquinone.

The aromatic amine compound which is used as one of the reactants for the condensate, is exemplified by the compounds of the above general formulas (5) to (8).

Typical examples of the aromatic hydroxyl compound-aromatic amine compound condensates include pyrogallol-p-phenylenediamine condensates, resorcinol-m-phenylenediamine condensates, pyrogallol-1,8-diaminonaphthalene condensates, catechol-1,8-diaminonaphthalene condensates, 2,7-dihydroxynaphthalene-p-aminophenol condensates, 4-aminodiphenylamine-pyrogallol condensates, 2,3-dihydroxynaphthalene-1,5-diaminonaphthalene condensates, and the like.

(V) Natural aromatic hydroxyl-containing organic compound

The natural aromatic hydroxyl-containing organic compounds include, for example, Chinese gallotannin, sumac tannin, tara tannin, valonia tannin, chestnut tannin, myrobalan tannin, oak tannin, divi-divi tannin, algarobillatannin, gambier tannin, quebrachotannin, wattle tannin, mimosa tannin, mangrove tannin, hemlock tannin, spruce tannin, Burma cutch tannin, oak bark tannin, tannin of persimmon, curcumin, urushiol, lignin, sodium lignin sulfonate, alkali lignin and the like.

Among the aromatic hydroxyl compound-based condensates (I) to (V) above, preferred are pyrogallol-acetone condensates, 2,7-dihydroxynaphthalene-acetone condensates, 2,3-dihydroxynaphthalene-acetone condensates, resorcinol-acetone condensates, 2,7-dihydroxynaphthalene-benzaldehyde condensates, 2,3-dihydroxynaphthalene-formaldehyde condensates, 1,4,5,8-tetrahydroxynaphthalene-benzaldehyde condensates, pyrogallol-formaldehyde condensates, 2,7-dihydroxynaphthalene condensates, pyrogallol condensates, 2,7-dihydroxynaphthalene-p-aminophenol condensates, catechol-4-aminodiphenylamine condensates, pyrogallol-1,8-diaminonaphthalene condensates, Chinese gallotannin, wattle tannin, mimosa tannin, oak tannin, hemlock tannin, quebrachotannin, chestnut tannin, tannin of persimmon, and mangrove tannin.

In the polymer scale preventive agent, the component (A) and the component (b-5) may, in part or entirely, undergo an addition reaction to form an addition reaction product such as quinhydrone.

The aromatic hydroxyl compound-based condensates (b-5) may be used either singly or in a combination of two or more thereof.

Among the (B) components above, preferred are the diphenyl compounds having at least two amino groups represented by the above general formula (7), the reducing agents (b-3), the aromatic hydroxyl compounds (b-4) and the aromatic hydroxyl compound-based condensates (b-5), and particularly preferred are the aromatic hydroxyl compound-based condensates (b-5).

The compounds set forth above as exemplary of component (B) may be used either singly or in a combination of two or more thereof.

Where the component (B) is incorporated in the polymer scale preventive agent of the present invention, the amount of the component (B) is normally 0.1 to 1,000 parts by weight, preferably 1 to 300 parts by weight, per 100 parts by weight of the component (A).

In order to further enhance the scale preventive effect, the polymer scale preventive agent of the present invention preferably comprise, with or without the component (B) above-described, (C) at least one member selected from the group consisting of (c-1) a water-soluble polymeric compound, (c-2) an inorganic colloid, and (c-3) an alkali metal silicate.

Presumably, these additives (c-1) to (c-3) interact with the condensation product (A), so that the water-soluble polymeric compound (c-1) improves the hydrophilic nature of the surface of the coating whereas each of the inorganic colloid (c-2) and the alkali metal silicate (c-3) increases the adhesion of the coating to the inner wall, etc., of the polymerization vessel.

Component (C)

(c-1) Water-soluble polymeric compound

The water-soluble polymeric compounds (c-1) include, for example, amphoteric polymeric compounds such as gelatin and casein, anionic polymeric compounds such as polyacrylic acid, polystyrenesulfonic acid, carboxymethyl cellulose, and alginic acid, cationic nitrogen-containing polymeric compounds such as polyvinyl pyrrolidone, chitosan and polyacrylamide, and hydroxyl-containing polymeric compounds such as polyvinyl alcohol, hydroxyethyl cellulose, hydroxypropyl cellulose and pectin.

Among the water-soluble polymeric compounds above, preferred are gelatin, casein, polyacrylic acid, carboxymethyl cellulose, polyvinyl pyrrolidone and pectin.

The water-soluble polymeric compounds (c-1) may be used either singly or in a combination of two or more thereof.

The amount of the water-soluble polymeric compound (c-1)) is preferably in the range of 1 to 1,000 parts by weight, and more preferably from 5 to 200 parts by weight per 100 parts by weight of the component (A).

(c-2) Inorganic colloid

The inorganic colloids (c-2) which can be added to the polymer scale preventive agent are those obtained by a condensing method or a dispersing method using water as a dispersion medium, with the colloidal particles ranging from 1 to 500 m$\mu$ in size.

Specifically, the applicable inorganic colloids include, for example, colloids of an oxide, a hydroxide or a mixture thereof, the oxide and hydroxide being those of a metal such as aluminum, thorium, titanium, zirconium, antimony, tin, iron and the like; colloids of tungstic acid, vanadium pentoxide, gold and silver; silver iodide sol; colloids of selenium, sulfur, silica and the like; and so forth.

Among the inorganic colloids above, preferred are colloids of an oxide, a hydroxide or a mixture thereof, the oxide and hydroxide being those of a metal selected from the group consisting of aluminum, titanium, zirconium, tin and iron; and colloidal silica.

The inorganic colloids (c-2) may be used either singly or in a combination of two or more thereof.

The inorganic colloids (c-2) are added in an amount of normally from 1 to 1,000 parts by weight, preferably from 5 to 500 parts by weight, per 100 parts by weight of the condensation product (A).

(c-3) Alkali metal silicates

The alkali metal silicates (c-3) which can be added to the polymer scale preventive agent of the present invention include, for example, metasilicates ($M_2SiO_3$), orthosilicates ($M_4SiO_4$), disilicates ($M_2Si_2O_3$), trisilicates ($M_3Si_3O_7$), sesquisilicates ($M_4Si_3O_{10}$) and the like of alkali metals such as lithium, sodium, potassium and the like (wherein M stands for an alkali metal such as lithium, sodium and potassium); and water glass.

The alkali metal silicates (c-3) may be used either singly or in a combination of two or more thereof.

The component (c-3) is added in an amount of normally 1 to 1,000 parts by weight, preferably 5 to 500 parts by weight, per 100 parts by weight of the condensation product (A).

Where the component (c-2) and the component (c-3) are used in combination, the total amount of the components (c-2) and (c-3) is preferably 1 to 1,000 parts by weight, more preferably 5 to 500 parts by weight, per 100 parts by weight of the component (A).

For best improving the polymer scale preventing effect, it is preferable to use a combination of the water-soluble polymeric compound (c-1) with the inorganic colloid (c-2) or a combination of the water-soluble polymeric compound (c-1) with the alkali metal silicate (c-3). Where the components (c-1) and (c-2) are used in combination, the amount of the component (c-2) is preferably 5 to 3,000 parts by weight, more preferably 50 to 1,000 parts by weight, per 100 parts by weight of the component (c-1). Where the components (c-1) and (c-3) are used in combination, the component (c-3) is preferably used in an amount of 5 to 3,000 parts by weight, more preferably 50 to 1,000 parts by weight, per 100 parts by weight of the component (c-1).

As described above, the polymer scale preventive agent of the present invention preferably comprises the component (B) or the component (C), and particularly preferably comprises both the component (B) and the component (C).

Polymer scale preventive agent

The polymer scale preventive agent according to the present invention comprises an alkaline solution containing the component (A), preferably containing the component (A) together with the component (B) and/or the component (C). The polymer scale preventive agent is applied to inner wall surfaces, etc., of a polymerization vessel and is dried to form a coating, whereby polymer scale can be prevented from being deposited on the polymerization vessel inner wall or the like.

The polymer scale preventive agent may be prepared, for example, in the following manner. First, the solution containing the condensation product obtained by the condensation reaction of a quinone compound as above is admixed, if necessary, with the component (B) and/or the component (C), and with a solvent (which will be described below) as required. Then, if the pH of the resulting solution is not on the alkaline side, the pH is controlled to the alkaline side. Alternatively, the polymer scale preventive agent may be prepared by putting the condensation product-containing solution into cold water to precipitate the condensation product, then separating the precipitate by filtration and drying it, adding the solvent (described below) to the dried precipitate, together with the component (B) and/or the component (C) if necessary, and controlling the pH of the resulting solution to the alkaline side.

Because the polymer scale preventive agent of the present invention is alkaline, the solubility of the condensation product in the solvent is improved and a uniform solution can be obtained. Therefore, by applying the polymer scale preventive agent to the polymerization vessel inner wall surfaces, etc., an improved scale preventive effect can be obtained. The pH of the inventive polymer scale preventive agent preferably ranges from 7.5 to 13.5, more preferably from 8.0 to 13.5. For pH adjustment, alkaline compounds can be used, for example, alkali metal compounds such as LiOH, NaOH, KOH, $Na_2CO_3$, $Na_2HPO_4$ and the like, ammonium compounds such as $NH_4OH$ and the like, organic amine compounds such as ethylenediamine, monoethanolamine, diethanolamine, triethanolamine, and so forth.

The solvent for use in preparation of the polymer scale preventive agent of the present invention includes, for example, water; alcohols such as methanol, ethanol, propanol, butanol, 2-butanol, 2-methyl-l-propanol, 2-methyl- 2-propanol, 3-methyl-1-butanol, 2-methyl-2-butanol, 2-pentanol and the like; ketones such as acetone, methyl ethyl ketone, methyl isobutyl ketone and the like; esters such as methyl formate, ethyl formate, methyl acetate, ethyl acetate, methyl acetoacetate and the like; ethers such as 4-methyldioxolan, ethylene glycol diethyl ether and the like; furans; aprotic solvents such as dimethylformamide, dimethyl sulfoxide, acetonitrile and the like; and so forth. These may be used either singly or as a mixed solvent of two or more thereof on a case-by-case basis.

Among the above solvents, preferred are water and mixed solvents of water and an organic solvent miscible with water. The organic solvents miscible with water include, for example, alcohols such as methanol, ethanol, propanol and the like; ketones such as acetone, methyl ethyl ketone and the like; and esters such as methyl acetate, ethyl acetate and the like. The mixed solvents of water and an organic solvent miscible with water preferably contain the organic solvent in such an amount that there is no fear about inflammation, explosion or the like and safety in handling is ensured as to virulence, etc. Specifically, the amount of the organic solvent is preferably not more than 50% by weight, a more preferable amount being not more than 30% by weight.

The concentration of the condensation product (A) in the alkaline solution is not particularly limited, as long as the total coating weight described later can be obtained. Normally, the concentration of the condensation product is on the order of 0.001 to 5% by weight, a preferable concentration being on the order of 0.01 to 1% by weight. Where the component (B) is added solely, the total concentration of the component (A) and the component (B) is normally on the order of 0.01 to 10% by weight, preferably on the order of 0.1 to 3% by weight. Where the component (C) is added solely, the total concentration of the components (A) and (C) is normally on the order of 0.05 to 10% by weight, preferably on the order of 0.1 to 3% by weight. Where both the component (B) and the component (C) are added, the total concentration of the components (A) to (C) is normally on the order of 0.1 to 20% by weight, preferably on the order of 0.2 to 6% by weight.

Formation of coating

To form a coating on inner wall surfaces of a polymerization vessel using the polymer scale preventive agent prepared as above-described, first the agent is applied to the inner wall surfaces of the polymerization vessel. Then, the applied agent is dried sufficiently at a temperature ranging, for example, from room temperature to 100° C., optionally followed by washing with water.

The polymer scale preventive agent is preferably applied to not only the inner wall surfaces of a polymerization vessel but also other areas with which the monomer comes into contact during polymerization, for example, stirring blades, stirring shaft, baffles, condensers, headers, search coil, bolts, nuts, etc.

More preferably, for formation of the coating, the polymer scale preventive agent is applied to areas with which the monomer does not come into contact during polymerization but on which polymer scale may be deposited, for example, the inner surfaces, etc., of equipment and pipes of an unreacted monomer recovery system. Specifically, such areas include the inner surfaces of monomer distillation columns, condensers, monomer stock tanks, valves, and so on.

The method of applying the polymer scale preventive agent to the inner wall surfaces of a polymerization vessel is not particularly restricted, and includes, for example, brush coating, spray coating, a method which involves filling the polymerization vessel with the polymer scale preventive agent followed by withdrawal thereof, and the automatic coating methods as disclosed in Japanese Pre-examination Patent Publication (KOKAI) Nos. 57-61001 and 55-36288, Japanese Patent Publication (KOHYO) Nos. 56-501116 and 56-501117, and Japanese Pre-examination Patent Publication (KOKAI) No. 59-11303, etc.

The method of drying wet coated surfaces provided by application of the polymer scale preventive agent is also not restricted. For example, the following methods can be used: a method in which, after the agent is applied, hot air with a suitable elevated temperature is blown onto the coated surface; a method in which the inner wall surfaces of a polymerization vessel and the surfaces of other parts to be coated are preliminarily heated, for example, to a temperature of 30° to 80° C., and the polymer scale preventive agent is directly applied to the heated surfaces; and so on. After drying, the coated surfaces are washed with water, if necessary.

The coating obtained in this manner has a total coating weight after drying of normally 0.001 to 5 $g/m^2$, preferably 0.05 to 2 $g/m^2$.

The formed coating has good durability and retains the polymer scale-preventing action; therefore, the above-described coating operation may not necessarily be carried out with every polymerization batch. Accordingly, productivity is improved.

Polymerization

After the formation of the coating on the inner wall surfaces of a polymerization vessel, and preferably also on other areas with which monomer may come into contact during polymerization, etc., by the coating operation as above, polymerization is carried out in accordance with conventional procedures. That is, a monomer having an ethylenically unsaturated double bond, a polymerization initiator (catalyst), and optionally a polymerization medium such as water, etc., a dispersing agent such as suspending agents, solid dispersing agents, nonionic or anionic emulsifying agents, etc., and the like are charged into the polymerization vessel, and then polymerization is carried out according to conventional procedures.

The monomers having an ethylenically unsaturated double bond which can be polymerized by applying the process of the present invention include, for example, vinyl halides such as vinyl chloride and the like; vinyl esters such as vinyl acetate, vinyl propionate and the like; acrylic acid, methacrylic acid, and their esters and salts; maleic acid, fumaric acid, and their esters and anhydrides; diene monomers such as butadiene, chloroprene, isoprene and the like; styrene; acrylonitrile; vinylidene halides; vinyl ethers; and so forth. These monomers may be used either singly or in a combination of two or more thereof.

There are no particular restrictions on the type of polymerization to which the process according to the present invention can be applied. That is, the process of the present invention is effective in any of such polymerization types as suspension polymerization, emulsion polymerization, solution polymerization, bulk polymerization, and gas phase polymerization. Particularly, the process of the present invention is more suited to polymerizations in an aqueous medium, such as suspension polymerization and emulsion polymerization.

In the following, taking the cases of suspension polymerization and emulsion polymerization as an examples, general procedures of polymerization will be described.

First, water and a dispersing agent are charged into a polymerization vessel. Subsequently, the polymerization vessel is evacuated to reduce the internal pressure to a value of 0.1 to 760 mmHg, and a monomer is then charged, whereupon the internal pressure usually takes a value of 0.5 to 30 $kgf/cm^2 \cdot G$. A polymerization initiator is charged into the vessel before and/or after charging the monomer. Subsequently, polymerization is carried out at a reaction temperature of 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C. while in the case of polymerizing styrene, polymerization is carried out at 50° to 150° C. The polymerization may be judged to be completed when the pressure inside the polymerization vessel has fallen to a value of 0 to 7 kgf/cm$^2$.G or when cooling water which flows into and out of a jacket provided around the polymerization vessel has come to show approximately equal inlet and outlet temperatures (i.e., when liberation of heat due to the polymerization reaction has subsided). The amounts of the water, dispersing agent and polymerization initiator to be charged for polymerization are normally 20 to 500 parts by weight, 0.01 to 30 parts by weight, and 0.01 to 5 parts by weight, respectively, per 100 parts by weight of the monomer.

In solution polymerization, an organic solvent such as toluene, xylene, pyridine, etc., is used as the polymerization medium, in place of water. A dispersing agent may be used, if necessary. The other conditions for polymerization are generally the same as those described for suspension and emulsion polymerizations.

In bulk polymerization, after a polymerization vessel is evacuated to a pressure of about 0.01 mmHg to about 760 mmHg, a monomer and a polymerization initiator are charged into the polymerization vessel, and then polymerization is carried out at a reaction temperature of −10° C. to 250° C. For example, the reaction temperature is 30° to 80° C. for the polymerization of vinyl chloride, and is 50° to 150° C. for the polymerization of styrene.

Where polymerization is carried out by applying the process of the present invention, it is possible to prevent polymer scale from being deposited, regardless of the materials of the inner wall, etc., of a polymerization vessel. For example, where the polymerization vessel is made of a stainless steel or other steel as well as where the polymerization vessel is a glass-lined one or the like, the polymer scale deposition can be prevented from occurring during polymerization.

Those additive materials which are conventionally added in polymerization systems can be used without any limitations. That is to say, the process of the present invention can effectively prevent polymer scale deposition in polymerization systems which may contain additive materials including, for example, polymerization initiators such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethoxyethyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, p-menthane hydroperoxide, etc.; suspending agents comprised of, for example, natural or synthetic polymeric compounds such as partially saponified polyvinyl alcohols, polyacrylic acids, vinyl acetate/maleic anhydride copolymers, cellulose derivatives (e.g., hydroxypropyl methyl cellulose), gelatin, etc.; solid dispersing agents such as calcium phosphate, hydroxyapatite, etc.; nonionic emulsifying agents such as sorbitan monolaurate, sorbitan trioleate, polyoxyethylene alkyl ether, etc.; anionic emulsifying agents such as sodium lauryl sulfate, sodium alkyl-benzenesulfonates (e.g. sodium dodecylbenzenesulfonate), sodium dioctylsulfosuccinate, etc.; fillers such as calcium carbonate, titanium oxide, etc.; stabilizers such as tribasic lead sulfate, calcium stearate, dibutyltin dilaurate, dioctyltin mercaptide, etc.; lubricants such as rice wax, stearic acid, cetyl alcohol, etc.; plasticizers such as DOP, DBP, etc.; chain transfer agents such as mercaptans (e.g. t-dodecyl mercaptan), trichloroethylene, etc.; pH adjusters, and so forth.

In addition to being used for formation of the coating on the inner wall surfaces, etc., of the polymerization vessel, the polymer scale preventive agent of the present invention may further be added directly to the polymerization system, whereby a further enhanced effect in preventing deposition of polymer scale can be obtained. In that case, the addition amount of the agent suitably ranges from about 10 to about 1,000 ppm based on the total weight of the monomer or monomers charged into the polymerization vessel. At the time of adding the polymer scale preventive agent, care should be taken not to affect adversely the fish eyes, bulk specific gravity, particle size distribution or other qualities of the resulting polymeric product.

EXAMPLES

The present invention will now be described in detail below, with reference to working examples thereof and comparative examples. In the tables below, the experiments bearing a No. marked with * are comparative examples, and the other experiments, bearing a non-marked No., are working examples of the present invention.

Production Example 1
Production of condensation product No. 1

A 2-liter reaction vessel equipped with a reflux condenser was charged with a mixed solvent consisting of 450 g of methanol and 450 g of water, to which were added 100 g of α-naphthoquinone as a quinone compound and 10 g of sodium hydroxide. Next, after heating to 65° C., the mixture in the reaction vessel was reacted at 65° C. for 10 hours, followed by cooling to room temperature to give a condensation product, which is hereinafter referred to as condensation product No. 1.

The molecular weight of the condensation product No. 1 thus obtained was measured by the method below to be 3,000.

Measurement of molecular weight

Molecular weight was measured by gel permeation chromatography (GPC), and is given as number average molecular weight in terms of polystyrene. The molecular weight measurement was carried out under the following conditions:

Column:
 Guard column: Shim-pack GPC-800DP (trade name), produced by Shimadzu Corp.
 Separate column: Shim-pack GPC-803D (trade name), produced by Shimadzu Corp.

Mobile phase: 10 mM LiBr/DMF

Flow rate: 1.0 ml/min

Detector: RI

Temperature: 60° C.

Production of condensation product Nos. 2 to 9

Condensation product Nos. 2 to 9 were prepared in the same manner as in the above production of the condensation product No. 1 except for using the solvent, quinone compound (a) and alkaline compound given in Table 1.

Table 1 also shows the concentration (wt. %) of the quinone compound (a) in solution, the ratio (wt. %) of the amount of the alkaline compound to the amount of the quinone compound (a), reaction temperature and reaction time.

The condensation product Nos. 2 to 9 were subjected to molecular weight measurement by the same method as for the condensation product No. 1. The results are given in Table 1.

TABLE 1

| (A) Quinone compound condensation product No. | (a) Quinone compound | Conc. of component (a) (wt. %) | Alkaline compound | Ratio of alkaline compound to component (a) (wt. %) | Solvent (wt. ratio) | Reaction temp. (°C.) | Reaction time (Hr) | Molecular weight |
|---|---|---|---|---|---|---|---|---|
| 1 | α-Naphthoquinone | 10 | NaOH | 10 | Methanol:Water (50:50) | 65 | 10 | 3000 |
| 2 | α-Naphthoquinone | 10 | — | — | Dimethyl formamide | 100 | 40 | 1500 |
| 3 | α-Naphthoquinone | 10 | NaOH | 20 | Methanol:Water (50:50) | 25 | 30 | 3500 |
| 4 | α-Naphthoquinone | 10 | NaOH | 30 | Methanol | 65 | 10 | 3000 |
| 5 | α-Naphthoquinone | 10 | NaOH | 6 | Methanol | 65 | 10 | 3000 |
| 6 | Lawsone | 10 | NaOH | 3 | Ethanol | 80 | 50 | 1500 |
| 7 | P-Benzoquinone | 20 | KOH | 1 | Acetone | 65 | 10 | 2000 |
| 8 | β-Naphthoquinone | 5 | KOH | 10 | Ethanol | 80 | 10 | 1500 |
| 9* | α-Naphthoquinone | 10 | — | — | Dimethyl formamide | 25 | 1 | 158 |

Example 1
(Experiment Nos. 101 to 109)

In each experiment, polymerization was conducted using a stainless steel polymerization vessel with an inner capacity of 1,000 liters and having a stirrer, as described below.

In preparing a polymer scale preventive agent in each experiment, the condensation product (A), water-soluble polymeric compound (c-1), inorganic colloid (c-2) and alkali metal silicate (c-3) set forth in Table 2 as well as the alkaline compound and solvent set forth in Table 3 were used in such amounts as to produce the solvent composition, total concentration of (A)+(c-1)+(c-2)+(c-3), weight ratio of (A):(c-1):(c-2):(c-3), and pH shown in Table 3. The inorganic colloids (a to g, in Tables 2, 6, 9, 12, 15, 18, 21, 24, 27, 30, 33 and 36) which were used as the inorganic colloid of component (c-2) in this example and Examples 2 to 12 described below are shown in Table 5.

In each experiment, the polymer scale preventive agent prepared as above was applied to the inner wall, the stirring shaft, the stirring blades and other areas of the polymerization vessel with which a monomer comes into contact. The polymer scale preventive agent applied was dried by heating at 40° C. for 15 minutes to form a coating, followed by washing the inside of the polymerization vessel with water.

Thereafter, into the polymerization vessel in which the coating was formed as above, 400 kg of water, 200 kg of vinyl chloride, 250 g of a partially saponified polyvinyl alcohol, 25 g of hydroxypropyl methyl cellulose and 70 g of 3,5,5-trimethylhexanoyl peroxide were charged, followed by polymerization at 66° C. for 6 hours. After the completion of the polymerization, the produced polymer was taken out and unreacted monomer was recovered from the polymerization vessel. Subsequently, the inside of the polymerization vessel was washed with water and residual resin was removed.

Thereafter, the above process including the polymerization and the washing of the inside of the polymerization vessel with water was repeated batchwise, without carrying out the coating operation, the repetition number of the batches being given in Table 4.

After the final batch was over, in each experiment, the amount of polymer scale deposited on areas located in the liquid-phase region and that on areas around the interface between the gas and liquid phases inside the polymerization vessel were determined according to the method described below. The results are given in Table 4.
Measurement of the amount of polymer scale deposited The scale deposited in an area of 10 cm square at a predetermined location on the inner wall of a polymerization vessel is scraped off with a stainless steel spatula as completely as can be confirmed with the naked eye, and then the scraped scale is weighed on a balance. The measured value is multiplied by 100 to obtain the amount of the deposited polymer scale per area of 1 $m^2$.

The number of fish eyes appearing upon formation of a polymer into a sheet was also measured with respect to the polymers obtained in the experiments, according to the method below. The results are given in Table 4.
Measurement of fish eyes A hundred (100) parts by weight of a polymer obtained, 50 parts by weight of dioctyl phthalate (DOP), 1 part by weight of dibutyltin dilaurate, 1 part by weight of cetyl alcohol, 0.25 part by weight of titanium oxide and 0.05 part by weight of carbon black are mixed. The resulting mixture is kneaded at 150° C. for 7 minutes with 6 inch rolls, and then formed into a sheet 0.2 mm thick. The obtained sheet is examined for the number of fish eyes per 100 $cm^2$ by light transmission.

Further, measurement of luminosity index (L value) of a sheet formed from a polymer was carried out, according to the method below, with respect to the polymers produced in the experiments. The results are given in Table 4.
Measurement of luminosity index (L value)

A hundred (100) parts by weight of the obtained polymer, 1 part by weight of a tin laurate stabilizing agent (TS-101, product of Akishima Chemical Co.) and 0.5 part by weight of a cadmium stabilizing agent (C-100J, product of Katsuta Kako Co.), and 50 parts by weight of dioctyl phthalate as a plasticizer are kneaded at 160° C. for 5 minutes with a twin roll mill, and then formed into a sheet 1 mm thick. Subsequently, this sheet is placed in a mold measuring 4×4×1.5 cm, heated at 160° C. under a pressure of 65 to 70 kgf/$cm^2$ for 0.2 hour and press molded under the same conditions to prepare a test specimen. This test specimen is measured for luminosity index L in the Hunter's color difference equation described in JIS Z 8730 (1980). The greater the value of L, the higher the whiteness evaluated, namely, the slighter the initial coloration evaluated.

The value of L is determined as follows.

The stimulus value Y of the XYZ color system is determined by the photoelectric tristimulus colorimetry using the standard light C, photoelectric calorimeter (Color measuring color difference meter Model Z-1001DP, product of Nippon Denshoku Kogyo K.K.) in accordance with JIS Z 8722. As the geometric condition of illumination and light reception, the condition d defined in section 4.3.1 of JIS Z 8722 is adopted. From the stimulus value Y obtained, the L value is calculated based on the equation: $L=10Y^{1/2}$ described in JIS Z 8730 (1980).

TABLE 2

| Exp No. | (A) Condensation product No. | (c-1) Water-soluble polymeric compound | (c-2) Inorganic colloid | (c-3) Alkali metal silicate |
|---|---|---|---|---|
| 101 | 1 | Gelatin | b | — |
| 102 | 2 | Gelatin | b | — |
| 103 | 3 | — | b | — |
| 104 | 4 | Polyacrylic acid | c | — |
| 105 | 5 | Carboxymethyl cellulose | a | — |
| 106 | 6 | — | — | — |
| 107 | 7 | Polyvinyl alcohol | d | — |
| 108 | 8 | Polyvinyl pyrrolidone | — | Sodium metasilicate |
| 109* | 9* | Gelatin | b | — |

TABLE 3

| Exp. No. | Total conc. of (A) + (c-1) + (c-2) + (c-3) (wt. %) | (A):(c-1):(c-2):(c-3) (wt. ratio) | Alkaline compound (pH) | Solvent (wt. ratio) |
|---|---|---|---|---|
| 101 | 0.5 | 100:100:100:— | NaOH (11.0) | Water:Methanol (70:30) |
| 102 | 0.5 | 100:100:100:— | NaOH (11.0) | Water:Dimethyl formamide (95:5) |
| 103 | 0.5 | 100:—:100:— | NaOH (11.0) | Water:Methanol (70:30) |
| 104 | 0.5 | 100:50:100:— | NaOH (11.0) | Water:Methanol (90:10) |
| 105 | 0.5 | 100:50:200:— | KOH (11.0) | Water:Methanol (90:10) |
| 106 | 0.5 | — | Ethylene diamine (11.5) | Water:Ethanol (90:10) |
| 107 | 0.5 | 100:100:200:— | Ethylene diamine (11.5) | Water:Acetone (90:10) |
| 108 | 0.5 | 100:100:—:300 | Ethylene diamine (11.5) | Water:Methanol (90:10) |
| 109* | 0.5 | 100:100:100:— | — | Water:Dimethyl formamide (95:5) |

TABLE 4

Results of the polymerization

Polymer scale amount (g/m²)

| Exp. No. | Repetition number of batches | Liquid phase | Around interface between gas and liquid phases | Number of fish eyes | Luminosity index (L) |
|---|---|---|---|---|---|
| 101 | 4 | 0 | 5 | 9 | 73.0 |
| 102 | 3 | 1 | 13 | 16 | 73.0 |
| 103 | 3 | 0 | 9 | 11 | 73.0 |
| 104 | 4 | 0 | 6 | 10 | 73.0 |
| 105 | 4 | 0 | 6 | 9 | 73.0 |
| 106 | 3 | 0 | 16 | 18 | 73.0 |
| 107 | 4 | 0 | 7 | 11 | 73.0 |
| 108 | 4 | 0 | 5 | 8 | 73.0 |
| 109* | 2 | 18 | 99 | 42 | 73.0 |

TABLE 5

| | Diameter of colloidal particles (mµ) | Name of article | Manufacturer |
|---|---|---|---|
| a | 10 ~ 20 | Snowtex 0 * (colloidal silica) | Nissan Chemical Industries, Ltd. |
| b | 5 ~ 7 | Snowtex CXS-9 * (colloidal silica) | Nissan Chemical Industries, Ltd. |
| c | 100 ~ 200 | Titanium oxide | Nissan Chemical Industries, Ltd. |
| d | 10 ~ 20 | Aluminum oxide | Nissan Chemical Industries, Ltd. |
| e | 60 ~ 70 | Zirconium oxide | Nissan Chemical Industries, Ltd. |
| f | 20 ~ 50 | Tin oxide | Nissan Chemical Industries, Ltd. |
| g | 10 ~ 15 | iron hydroxide | produced by the present inventers |

Note *: trade names

Example 2

(Experiment Nos. 201 to 209)

In each experiment, a stainless-steel polymerization vessel having an internal capacity of 20 liters and equipped with a stirrer was used for polymerization.

In preparation of a polymer scale preventive agent in each experiment, the condensation product (A), water-soluble polymeric compound (c-1), inorganic colloid (c-2) and alkali metal silicate (c-3) set forth in Table 6 as well as the alkaline compound and solvent set forth in Table 7 were used in such amounts as to produce the solvent composition, total concentration of (A)+(c-1)+(c-2)+(c-3), weight ratio of (A):(c-1):(c-2):(c-3), and pH given in Table 7. The polymer scale preventive agent thus prepared was applied to the inner wall of the polymerization vessel and to the stirring shaft, stirring blades and the like areas with which the monomer comes into contact during polymerization. The polymer scale preventive agent applied was dried by heating at 40° C. for 15 minutes to form a coating, followed by washing the inside of the polymerization vessel with water.

Subsequently, in each experiment, polymerization was carried out as follows. The polymerization vessel provided with the coating as above was charged with 9 kg of water, 225 g of sodium dodecylbenzenesulfonate, 12 g of t-dodecyl mercaptan and 13 g of potassium peroxodisulfate. The inside atmosphere of the polymerization vessel was replaced with nitrogen gas, thereafter 1.3 kg of styrene and 3.8 kg of butadiene were charged into the vessel, and polymerization was carried out at 50° C. for 20 hours. After the polymerization was completed, the polymeric product and unreacted monomers were recovered, followed by washing the inside of the vessel with water to remove residual resin.

Thereafter, the above process including the polymerization and the washing of the inside of the polymerization vessel with water was repeated batchwise, without carrying out the coating operation, the repetition number of the batches being given in Table 8.

After the final batch was over, in each experiment, the amount of polymer scale deposited on areas located in the liquid-phase region and that on areas around the interface between the gas and liquid phases inside the polymerization vessel were determined according to the same method as in Example 1. The results are given in Table 8.

Measurement of luminosity index (L value) of a sheet formed from a polymer was also carried out with respect to each of the polymers produced in the experiments, according to the method below. The results are given in Table 8.

Measurement of luminosity index (L value)

To 1 kg of the polymer latex obtained was added 1 kg of a 2% magnesium sulfate solution to cause aggregation and sedimentation. The sediment was filtered off, washed with a hot water at 80° to 90° C. two or three times and dried at 40° C. for 25 hours in a vacuum dryer to give a resin.

The resin was placed in a mold measuring 9×9×0.1 cm (depth), heated at 195° C. under a pressure of 50 to 60 kgf/cm² for 0.2 hour and press molded under a final pressure of 80 kgf/cm² to prepare a test specimen. This test specimen was measured for luminosity index L in the same manner as in Example 1.

TABLE 6

| Exp No. | (A) Condensation product No. | (c-1) Water-soluble polymeric compound | (c-2) Inorganic colloid | (c-3) Alkali metal silicate |
|---|---|---|---|---|
| 201 | 1 | Polyacrylic acid | b | — |
| 202 | 2 | Polyacrylic acid | b | — |
| 203 | 3 | — | b | — |
| 204 | 4 | Sodium alginate | e | — |
| 205 | 5 | Polyvinyl pyrrolidone | f | — |
| 206 | 6 | Polyvinyl pyrrolidone | g | — |
| 207 | 7 | — | — | — |
| 208 | 8 | Gelatin | — | Water glass |
| 209* | 9* | Polyacrylic acid | b | — |

TABLE 7

| Exp. No. | Total conc. of (A) + (c-1) + (c-2) + (c-3) (wt. %) | (A):(c-1): (c-2):(c-3) (wt. ratio) | Alkaline compound (pH) | Solvent (wt. ratio) |
|---|---|---|---|---|
| 201 | 0.5 | 100:100:100:— | NaOH (11.0) | Water:Methanol (70:30) |
| 202 | 0.5 | 100:100:100:— | NaOH (11.0) | Water:Dimethyl formamide (95:5) |
| 203 | 0.5 | 100:—:100:— | NaOH (11.0) | Water:Methanol (70:30) |
| 204 | 0.5 | 100:100:200:— | NaOH (11.0) | Water:Methanol (70:30) |
| 205 | 0.5 | 100:100:300:— | NaOH (11.0) | Water:Methanol (70:30) |
| 206 | 0.5 | 100:50:100:— | KOH (11.0) | Water:Ethanol (70:30) |
| 207 | 0.5 | — | Ethylene diamine (11.5) | Water:Acetone (70:30) |
| 208 | 0.5 | 100:200:—:100 | Ethylene diamine (11.5) | Water Methanol (70:30) |
| 209* | 0.5 | 100:100:100:— | — | Water:Dimethyl formamide (95:5) |

TABLE 8

| | | Results of polymerization | | |
|---|---|---|---|---|
| | | Polymer scale amount (g/m²) | | |
| Exp. No. | Repetition number of batches | Liquid phase | Around interface between gas and liquid phases | Luminosity index (L) |
| 201 | 3 | 0 | 6 | 85.0 |
| 202 | 2 | 1 | 12 | 85.0 |
| 203 | 2 | 0 | 8 | 85.0 |
| 204 | 3 | 0 | 5 | 85.0 |
| 205 | 3 | 0 | 5 | 85.0 |
| 206 | 3 | 0 | 4 | 85.0 |
| 207 | 2 | 1 | 23 | 85.0 |
| 208 | 3 | 0 | 6 | 85.0 |
| 209* | 1 | 24 | 142 | 85.0 |

Example 3
(Experiment Nos. 301 to 318)

In each experiment, the same polymerization vessel as that used in Example 1 was used.

In preparing a polymer scale preventive agent in each experiment, the condensation product (A), aromatic amine compound (b-1), water-soluble polymeric compound (c-1), inorganic colloid (c-2) and alkali metal silicate (c-3) set forth in Table 9 as well as the alkaline compound and solvent set forth in Table 10 were used in such amounts as to produce the solvent composition, total concentration of (A)+(b-1)+(c-1)+(c-2)+(c-3), weight ratio of (A):(b-1):(c-1):(c-2):(c-3), and pH shown in Table 10. The scale preventive agent prepared was applied to the inner wall, the stirring shaft, the stirring blades and other areas of the polymerization vessel with which a monomer comes into contact. The preventive agent applied was dried by heating at 40° C. for 15 minutes to form a coating, followed by washing the inside of the polymerization vessel with water.

Thereafter, in each experiment, the process including the polymerization and the washing of the inside of the polymerization vessel with water was repeated batchwise in the same manner as in Example 1, the repetition number of batches being given in Table 11.

After the final batch was over, in each experiment, the amount of polymer scale deposited on areas located in the liquid-phase region and that on areas around the interface between the gas and liquid phases inside the polymerization vessel were determined according to the same method as in Example 1. The results are given in Table 11.

Measurement of the luminosity index (L value) of a sheet formed from a polymer was also carried out with respect to each of the polymers produced in the experiments, according to the same method as in Example 1. The results are given in Table 11.

TABLE 9

| Exp. No. | (A) Condensation product No. | (b-1) Aromatic amine compound | (c-1) Water-soluble polymeric compound | (c-2) Inorganic colloid | (c-3) Alkali metal silicate |
|---|---|---|---|---|---|
| 301 | 1 | 1,8-Diaminonaphthalene | Gelatin | b | — |
| 302 | 2 | 1,5-Diaminonaphthalene | Polyacrylic acid | b | — |
| 303 | 3 | 4-Aminodiphenylamine | — | b | — |
| 304 | 4 | 1-Amino-5-hydroxynaphthalene | Polyacrylic acid | c | — |
| 305 | 5 | p-Aminosalicylic acid | Carboxymethyl cellulose | a | — |
| 306 | 6 | p-Aminophenol | — | — | — |
| 307 | 7 | 2-Nitro-4-aminophenol | Polyvinyl alcohol | d | — |
| 308 | 8 | p-Aminobenzenesulfonic acid | Polyvinyl pyrrolidone | — | Water glass |
| 309* | 9* | 1,8-Diaminonaphthalene | Polyvinyl pyrrolidone | b | — |
| 310 | 1 | 4,4'-Diaminodiphenyl sulfone | Gelatin | b | — |
| 311 | 2 | 4,4'-Diaminodiphenylmethane | Polyacrylic acid | b | — |
| 312 | 3 | 4,4'-Diaminobenzanilide | — | b | — |
| 313 | 4 | 4,4'-Diaminobenzanilide | Polyacrylic acid | c | — |
| 314 | 5 | 4,4'-Diaminobenzanilide | Na salt of carboxymethyl cellulose | a | — |
| 315 | 6 | 4,4'-Diaminodiphenyl sulfone | — | — | — |
| 316 | 7 | 4,4'-Diaminodiphenyl ether | Polyvinyl alcohol | d | — |
| 317 | 8 | 4,4'-Diaminodiphenyl sulfone | Polyvinyl pyrrolidone | — | Sodium metasilicate |
| 318* | 9* | 4,4'-Diaminodiphenyl sulfone | Polyvinyl pyrrolidone | b | — |

TABLE 10

| Exp. No. | Total conc. of (A) + (b-1) + (c-1) + (c-2) + (c-3) (wt. %) | (A):(b-1):(c-1): (c-2):(c-3) (wt. ratio) | Alkaline compound (pH) | Solvent (wt. ratio) |
|---|---|---|---|---|
| 301 | 0.5 | 100:30:100:100:— | NaOH (12.5) | Water:Methanol (70:30) |
| 302 | 0.5 | 100:20:100:100:— | NaOH (12.5) | Water:Dimethyl formamide (95:5) |
| 303 | 0.5 | 100:20:—:100:— | NaOH (12.5) | Water:Methanol (70:30) |
| 304 | 0.5 | 100:10:50:100:— | NaOH (12.5) | Water:Methanol (90:10) |
| 305 | 0.5 | 100:5:50:200:— | NaOH (12.5) | Water:Methanol (90:10) |
| 306 | 0.5 | 100:5:—:—:— | KOH (12.5) | Water:Ethanol (90:10) |
| 307 | 0.5 | 100:10:100:200:— | Ethylene diamine (13.0) | Water:Acetone (90:10) |
| 308 | 0.5 | 100:10:100:—:200 | Ethylene diamine (13.0) | Water:Methanol (90:10) |
| 309* | 0.5 | 100:10:100:300:— | — | Water:Dimethyl formamide (95:5) |
| 310 | 0.5 | 100:30:100:100:— | NaOH (11.0) | Water:Methanol (70:30) |
| 311 | 0.5 | 100:20:100:100:— | NaOH (11.0) | Water:Dimethyl formamide (95:5) |
| 312 | 0.5 | 100:20:—:100:— | NaOH (11.0) | Water:Methanol (70:30) |
| 313 | 0.5 | 100:40:50:100:— | NaOH (11.0) | Water:Methanol (90:10) |
| 314 | 0.5 | 100:50:50:200:— | NaOH (11.0) | Water:Methanol (90:10) |
| 315 | 0.5 | 100:50:—:—:— | KOH (11.0) | Water:Ethanol (90:10) |
| 316 | 0.5 | 100:30:100:200:— | Ethylene diamine (11.5) | Water:Acetone (90:10) |
| 317 | 0.5 | 100:60:100:—:200 | Ethylene diamine (11.5) | Water:Methanol (90:10) |
| 318* | 0.5 | 100:10:100:300:— | — | Water:Dimethyl formamide (95:5) |

TABLE 11

Results of polymerization

| Exp. No. | Repetition number of batches | Liquid phase | Polymer scale amount (g/m²) Around interface between gas and liquid phases | Number of fish eyes | Luminosity index (L) |
|---|---|---|---|---|---|
| 301 | 5 | 0 | 5 | 3 | 73.0 |
| 302 | 5 | 0 | 2 | 1 | 73.0 |
| 303 | 4 | 0 | 1 | 1 | 73.0 |
| 304 | 5 | 0 | 4 | 2 | 73.0 |
| 305 | 5 | 0 | 5 | 3 | 73.0 |
| 306 | 4 | 0 | 3 | 3 | 73.0 |
| 307 | 5 | 0 | 4 | 3 | 73.0 |
| 308 | 5 | 0 | 5 | 3 | 73.0 |
| 309* | 2 | 15 | 90 | 42 | 73.0 |
| 310 | 6 | 0 | 2 | 3 | 73.0 |
| 311 | 6 | 0 | 2 | 4 | 73.0 |
| 312 | 5 | 0 | 4 | 8 | 73.0 |
| 313 | 6 | 0 | 2 | 3 | 73.0 |
| 314 | 6 | 0 | 2 | 4 | 73.0 |
| 315 | 5 | 0 | 4 | 7 | 73.0 |
| 316 | 6 | 0 | 3 | 4 | 73.0 |
| 317 | 6 | 0 | 3 | 4 | 73.0 |
| 318* | 2 | 16 | 96 | 40 | 73.0 |

Example 4
(Experiment Nos. 401 to 418)

In each experiment, the same polymerization vessel as that used in Example 2 was used.

In preparing a polymer scale preventive agent in each experiment, the condensation product (A), aromatic amine compound (b-1), water-soluble polymeric compound (c-1), inorganic colloid (c-2) and alkali metal silicate (c-3) set forth in Table 12 as well as the alkaline compound and solvent set forth in Table 13 were used in such amounts as to produce the solvent composition, total concentration of (A)+(b-1)+(c-1)+(c-2)+(c-3), weight ratio of (A):(b-1):(c-1):(c-2):(c-3), and pH shown in Table 13. The scale preventive agent prepared was applied to the inner wall, the stirring shaft, the stirring blades and other areas of the polymerization vessel with which a monomer comes into contact. The preventive agent applied was dried by heating at 40° C. for 15 minutes to form a coating, followed by washing the inside of the polymerization vessel with water.

Thereafter, in each experiment, the process including the polymerization and the washing of the inside of the polymerization vessel with water was repeated batchwise in the same manner as in Example 2, the repetition number of batches being given in Table 14.

After the final batch was over, in each experiment the amount of polymer scale deposited on areas located in the liquid-phase region and that on areas around the interface between the gas and liquid phases inside the polymerization vessel were determined according to the same method as in Example 1. The results are given in Table 14.

Measurement of the luminosity index (L value) of a sheet formed from a polymer was also carried out with respect to each of the polymers produced in the experiments, according to the same method as in Example 2. The results are given in Table 14.

TABLE 12

| Exp. No. | (A) Condensation product No. | (b-1) Aromatic amine compound | (c-1) Water-soluble polymeric compound | (c-2) Inorganic colloid | (c-3) Alkali metal silicate |
|---|---|---|---|---|---|
| 401 | 1 | 1,8-Diaminonaphthalene | Polyacrylic acid | b | — |
| 402 | 2 | 1,5-Diaminonaphthalene | Polyacrylic acid | b | — |
| 403 | 3 | 4-Aminodiphenylamine | — | b | — |
| 404 | 4 | 4,4'-Diaminodiphenylamine | Sodium alginate | e | — |
| 405 | 5 | 4-Amino-4'-hydroxy-diphenylamine | Polyvinyl pyrrolidone | f | — |
| 406 | 6 | p-Aminosalicylic acid | Polyvinyl pyrrolidone | g | — |
| 407 | 7 | p-Aminobenzenesulfonic acid | — | — | — |
| 408 | 8 | 2-Nitro-4-aminophenol | Gelatin | — | Water glass |
| 409* | 9* | 1,8-Diaminonaphthalene | Polyacrylic acid | b | — |
| 410 | 1 | 4,4'-Diaminodiphenyl sulfone | Polyacrylic acid | b | — |
| 411 | 2 | 4,4'-Diaminodiphenyl ether | Polyacrylic acid | b | — |
| 412 | 3 | 4,4'-Diaminobenzanilide | — | b | — |
| 413 | 4 | 4,4'-Diaminobenzanilide | Sodium alginate | e | — |
| 414 | 5 | 4,4'-Diaminobenzanilide | Polyvinyl pyrrolidone | f | — |
| 415 | 6 | 4,4'-Diaminobenzanilide | Polyvinyl pyrrolidone | g | — |
| 416 | 7 | 4,4'-Diaminodiphenyl sulfide | — | — | — |
| 417 | 8 | 4,4'-Diaminodiphenyl sulfone | Gelatin | — | Water glass |
| 418* | 9* | 4,4'-Diaminodiphenyl sulfone | Polyacrylic acid | b | — |

TABLE 13

| Exp. No. | Total conc. of (A) + (b-1) + (c-1) + (c-2) + (c-3) (wt. %) | (A):(b-1):(c-1): (c-2):(c-3) (wt. ratio) | Alkaline compound (pH) | Solvent (wt. ratio) |
|---|---|---|---|---|
| 401 | 0.5 | 100:30:100:100:— | NaOH (12.5) | Water:Methanol (70:30) |
| 402 | 0.5 | 100:20:100:100:— | NaOH (12.5) | Water:Dimethyl formamide (95:5) |
| 403 | 0.5 | 100:20:—:100:— | NaOH (12.5) | Water:Methanol (70:30) |

TABLE 13-continued

| Exp. No. | Total conc. of (A) + (b-1) + (c-1) + (c-2) + (c-3) (wt. %) | (A):(b-1):(c-1): (c-2):(c-3) (wt. ratio) | Alkaline compound (pH) | Solvent (wt. ratio) |
|---|---|---|---|---|
| 404 | 0.5 | 100:10:100:200:— | NaOH (12.5) | Water:Methanol (70:30) |
| 405 | 0.5 | 100:5:100:300:— | NaOH (12.5) | Water:Methanol (70:30) |
| 406 | 0.5 | 100:10:50:100:— | KOH (12.5) | Water:Methanol (70:30) |
| 407 | 0.5 | 100:10:—:—:— | Ethylenediamine (13.0) | Water:Ethanol (70:30) |
| 408 | 0.5 | 1000:10:200:—:100 | Ethylenediamine (13.0) | Water:Acetone (70:30) |
| 409* | 0.5 | 100:10:100:100:— | — | Water:Dimethyl formamide (95:5) |
| 410 | 0.5 | 100:30:100:100:— | NaOH (11.0) | Water:Methanol (70:30) |
| 411 | 0.5 | 100:20:100:100:— | NaOH (11.0) | Water:Dimethyl formamide (95:5) |
| 412 | 0.5 | 100:20:—:100:— | NaOH (11.0) | Water:Methanol (70:30) |
| 413 | 0.5 | 100:30:100:200:— | NaOH (11.0) | Water:Methanol (70:30) |
| 414 | 0.5 | 100:40:100:300:— | NaOH (11.0) | Water:Methanol (70:30) |
| 415 | 0.5 | 100:50:50:100:— | NaOH (11.0) | Water:Ethanol (70:30) |
| 416 | 0.5 | 100:50:—:—:— | KOH (11.5) | Water:Acetone (70:30) |
| 417 | 0.5 | 100:40:200:—:100 | Ethylenediamine (11.5) | Water:Methanol (70:30) |
| 418* | 0.5 | 100:50:100:100:— | — | Water:Dimethyl formamide (95:5) |

TABLE 14

| Exp. No. | Repetition number of batches | Results of polymerization | | Luminosity index (L) |
|---|---|---|---|---|
| | | Polymer scale amount (g/m²) | | |
| | | Liquid phase | Around interface between gas and liquid phases | |
| 401 | 4 | 0 | 2 | 85.0 |
| 402 | 4 | 0 | 1 | 85.0 |
| 403 | 3 | 0 | 1 | 85.0 |
| 404 | 4 | 0 | 3 | 85.0 |
| 405 | 4 | 0 | 2 | 85.0 |
| 406 | 4 | 0 | 3 | 85.0 |
| 407 | 3 | 0 | 2 | 85.0 |
| 408 | 4 | 0 | 3 | 85.0 |
| 409* | 1 | 25 | 140 | 85.0 |
| 410 | 5 | 0 | 4 | 85.0 |
| 411 | 5 | 0 | 6 | 85.0 |
| 412 | 4 | 0 | 3 | 85.0 |
| 413 | 5 | 0 | 3 | 85.0 |
| 414 | 5 | 0 | 4 | 85.0 |
| 415 | 5 | 0 | 4 | 85.0 |
| 416 | 5 | 0 | 9 | 85.0 |
| 417 | 5 | 0 | 3 | 85.0 |
| 418* | 1 | 25 | 145 | 85.0 |

Example 5

(Experiment Nos. 501 to 509)

In each experiment, the same polymerization vessel as that used in Example 1 was used.

In preparing a polymer scale preventive agent in each experiment, the condensation product (A), aliphatic diamine compound (b-2), water-soluble polymeric compound (c-1), inorganic colloid (c-2) and alkali metal silicate (c-3) set forth in Table 15 as well as the alkaline compound and solvent set forth in Table 16 were used in such amounts as to produce the solvent composition, total concentration of (A)+(b-2)+(c-1)+(c-2)+(c-3), weight ratio of (A):(b-2):(c-1):(c-2):(c-3), and pH shown in Table 16. The scale preventive agent prepared was applied to the inner wall, the stirring shaft, the stirring blades and other areas of the polymerization vessel with which a monomer comes into contact. The preventive agent applied was dried by heating at 40° C. for 15 minutes to form a coating, followed by washing the inside of the polymerization vessel with water.

Thereafter, in each experiment, the process including the polymerization and the washing of the inside of the polymerization vessel with water was repeated batchwise in the same manner as in Example 1, the repetition number of the batches being given in Table 17.

After the final batch was over, in each experiment the amount of polymer scale deposited on areas located in the liquid-phase region and that on areas around the interface between the gas and liquid phases inside the polymerization vessel were determined according to the same method as in Example 1. The results are given in Table 17.

Measurement of the luminosity index (L value) of a sheet formed from a polymer was also carried out with respect to each of the polymers produced in the experiments, according to the same method as in Example 1. The results are given in Table 17.

TABLE 15

| Exp. No. | (A) Condensation product No. | (b-2) Aliphatic diamine compound | (c-1) Water-soluble polymeric compound | (c-2) Inorganic colloid | (c-3) alkali metal silicate |
|---|---|---|---|---|---|
| 501 | 1 | Piperazine | Gelatin | b | — |
| 502 | 2 | Piperazine | Polyacrylic | b | — |

TABLE 15-continued

| Exp. No. | (A) Condensation product No. | (b-2) Aliphatic diamine compound | (c-1) Water-soluble polymeric compound | (c-2) Inorganic colloid | (c-3) alkali metal silicate |
|---|---|---|---|---|---|
| 503 | 3 | Piperazine | acid — | b | — |
| 504 | 4 | Piperazine | Polyacrylic acid | c | — |
| 505 | 5 | Piperazine | Carboxymethyl cellulose | a | — |
| 506 | 6 | 1,2-Diaminopropane | — | — | — |
| 507 | 7 | 1,3-Diamino-2-hydroxypropane | Polyvinyl alcohol | d | — |
| 508 | 8 | 1,4-Diaminobutane | Polyvinyl pyrolidone | — | Sodium metasilicate |
| 509* | 9* | Piperazine | Polyvinyl pyrolidone | b | — |

TABLE 16

| Exp. No. | Total conc. of (A) + (b-2) + (c-1) + (c-2) + (c-3) (wt. %) | (A):(b-2):(c-1): (c-2):(c-3) (wt. ratio) | Alkaline compound (pH) | Solvent (wt. ratio) |
|---|---|---|---|---|
| 501 | 0.5 | 100:300:100:100:- | —(13.0) | Water:Methanol (70:30) |
| 502 | 0.5 | 100:200:100:100:- | —(12.0) | Water:Dimethyl formamide (95:5) |
| 503 | 0.5 | 100:30:-:500:- | —(12.5) | Water:Methanol (70:30) |
| 504 | 0.5 | 100:100:50:100:- | —(8.5) | Water:Methanol (90:10) |
| 505 | 0.5 | 100:50:50:200:- | —(10.5) | Water:Methanol (90:10) |
| 506 | 0.5 | 100:200:-:-:- | —(13.5) | Water:Ethanol (90:10) |
| 507 | 0.5 | 100:100:100:200:- | —(9.0) | Water:Acetone (90:10) |
| 508 | 0.5 | 100:100:100:-:200 | —(12.5) | Water:Methanol (90:10) |
| 509* | 0.5 | 100:100:100:300:- | —(12.5) | Water:Dimethyl formamide (95:5) |

TABLE 17

| | | Results of polymerization | | |
|---|---|---|---|---|
| | Repetition | Polymer scale amount (g/m²) | | |
| Exp. No. | number of batches | Liquid phase | Around interface between gas and liquid phases | Number of fish eyes | Luminosity index (L) |
| 501 | 5 | 0 | 8 | 5 | 73.0 |
| 502 | 5 | 0 | 3 | 1 | 73.0 |
| 503 | 4 | 0 | 3 | 2 | 73.0 |
| 504 | 5 | 0 | 5 | 4 | 73.0 |
| 505 | 5 | 0 | 6 | 5 | 73.0 |
| 506 | 4 | 0 | 4 | 5 | 73.0 |
| 507 | 5 | 0 | 6 | 5 | 73.0 |
| 508 | 5 | 0 | 6 | 5 | 73.0 |
| 509* | 2 | 16 | 96 | 40 | 73.0 |

Example 6

(Experiment Nos. 601 to 609)

In each experiment, the same polymerization vessel as that used in Example 2 was used.

In preparing a polymer scale preventive agent in each experiment, the condensation product (A), aliphatic diamine compound (b-2), water-soluble polymeric compound (c-1), inorganic colloid (c-2) and alkali metal silicate (c-3) set forth in Table 18 as well as the alkaline compound and solvent set forth in Table 19 were used in such amounts as to produce the solvent composition, total concentration of (A)+(b-1)+(c-1)+(c-2)+(c-3), weight ratio of (A):(b-1):(c-1):(c-2):(c-3), and pH shown in Table 19. The scale preventive agent prepared was applied to the inner wall, the stirring shaft, the stirring blades and other areas of the polymerization vessel with which a monomer comes into contact. The preventive agent applied was dried by heating at 40° C. for 15 minutes to form a coating, followed by washing the inside of the polymerization vessel with water.

Thereafter, in each experiment, the process including the polymerization and the washing of the inside of the polymerization vessel with water was repeated batchwise in the same manner as in Example 2, the repetition number of the batches being given in Table 20.

After the final batch was over, in each experiment the amount of polymer scale deposited on areas located in the liquid-phase region and that on areas around the interface between the gas and liquid phases inside the polymerization vessel were determined according to the same method as in Example 1. The results are given in Table 11.

Measurement of the luminosity index (L value) of a sheet formed from a polymer was also carried out with respect to each of the polymers produced in the experiments, according to the same method as in Example 2. The results are given in Table 20.

TABLE 18

| Exp. No. | (A) Condensation product No. | (b-2) Aliphatic diamine compound | (c-1) Water-soluble polymeric compound | (c-2) Inorganic colloid | (c-3) alkali metal silicate |
|---|---|---|---|---|---|
| 601 | 1 | Piperazine | Polyacrylic acid | b | — |
| 602 | 2 | Piperazine | Polyacryiic acid | b | — |
| 603 | 3 | Piperazine | — | b | — |
| 604 | 4 | Piperazine | Sodium alginate | e | — |
| 605 | 5 | Piperazine | Polyvinyl pyrrolidone | f | — |
| 606 | 6 | Piperazine | Polyvinyl pyrrolidone | g | — |
| 607 | 7 | 1,3-Diamino-2-hydroxypropane | — | — | — |
| 608 | 8 | 1,4-Diaminobutane | Gelatin | — | Water glass |
| 609* | 9* | 1,2-Diaminopropane | Polyacrylic acid | b | — |

TABLE 19

| Exp. No. | Total conc. of (A) + (b-2) + (c-1) + (c-2) + (c-3) (wt. %) | (A):(b-2):(c-1): (c-2):(c-3) (wt. ratio) | Alkaline compound (pH) | Solvent (wt. ratio) |
|---|---|---|---|---|
| 601 | 0.5 | 100:300:100:100:- | —(12.5) | Water:Methanol (70:30) |
| 602 | 0.5 | 100:200:100:100:- | —(12.0) | Water:Dimethyl formamide (95:5) |
| 603 | 0.5 | 100:100:-:200:- | —(12.5) | Water:Methanol (70:30) |
| 604 | 0.5 | 100:100:100:200:- | —(9.0) | Water:Methanol (70:30) |
| 605 | 0.5 | 100:50:100:300:- | —(9.0) | Water:Methanol (70:30) |
| 606 | 0.5 | 100:100:50:100:- | —(9.0) | Water:Ethanol (70:30) |
| 607 | 0.5 | 100:100:-:-:- | —(13.0) | Water:Acetone (70:30) |
| 608 | 0.5 | 100:100:200:-:100 | —(12.5) | Water:Methanol (70:30) |
| 609* | 0.5 | 100:100:100:100:- | —(12.0) | Water:Dimethyl formamide (95.5) |

TABLE 20

| Exp. No. | Repetition number of batches | Results of polymerization | | |
|---|---|---|---|---|
| | | Polymer scale amount (g/m²) | | Luminosity index (L) |
| | | Liquid phase | Around interface between gas and liquid phases | |
| 601 | 4 | 0 | 6 | 85.0 |
| 602 | 4 | 0 | 2 | 85.0 |
| 603 | 3 | 0 | 2 | 85.0 |
| 604 | 4 | 0 | 6 | 85.0 |
| 605 | 4 | 0 | 7 | 85.0 |
| 206 | 4 | 0 | 6 | 85.0 |
| 607 | 3 | 0 | 5 | 85.0 |
| 608 | 4 | 0 | 7 | 85.0 |
| 609* | 1 | 25 | 145 | 85.0 |

Example 7

(Experiment Nos. 701 to 709)

In each experiment, the same polymerization vessel as that used in Example 1 was used.

In preparing a polymer scale preventive agent in each experiment, the condensation product (A), reducing agent (b-3), water-soluble polymeric compound (c-1), inorganic colloid (c-2) and alkali metal silicate (c-3) set forth in Table 21 as well as the alkaline compound and solvent set forth in Table 22 were used in such amounts as to produce the solvent composition, total concentration of (A)+(b-3)+(c-1)+(c-2)+(c-3), weight ratio of (A):(b-3):(c-1):(c-2):(c-3), and pH shown in Table 22. The scale preventive agent prepared was applied to the inner wall, the stirring shaft, the stirring blades and other areas of the polymerization vessel with which a monomer comes into contact. The preventive agent applied was dried by heating at 40° C. for 15 minutes to form a coating, followed by washing the inside of the polymerization vessel with water.

Thereafter, in each experiment, the process including the polymerization and the washing of the inside of the polymerization vessel with water was repeated batchwise in the same manner as in Example 1, the repetition number of the batches being given in Table 23.

After the final batch was over, in each experiment the amount of polymer scale deposited on areas located in the liquid-phase region and that on areas around the interface between the gas and liquid phases inside the polymerization vessel were determined according to the same method as in Example 1. The results are given in Table 23.

Measurement of the luminosity index (L value) of a sheet formed from a polymer was also carried out with respect to each of the polymers produced in the experiments, according to the same method as in Example 1. The results are given in Table 23.

TABLE 21

| Exp. No. | (A) Condensation product No. | (b-3) Reducing agent | (c-1) Water-soluble polymeric compound | (c-2) Inorganic colloid | (c-3) Alkali metal silicate |
|---|---|---|---|---|---|
| 701 | 1 | Sodium hydrogensulfite | Gelatin | b | — |
| 702 | 2 | Sodium hydrogensulfite | Polyacrylic acid | b | — |
| 703 | 3 | Sodium hydrogensulfite | — | b | — |
| 704 | 4 | Sodium hydrogensulfite | Polyacrylic acid | c | — |
| 705 | 5 | Rongalit | Carboxymethyl cellulose | a | — |
| 706 | 6 | Sodium bisulfite | — | — | — |
| 707 | 7 | Hydrogen iodide | Polyvinyl alcohol | d | — |
| 708 | 8 | Sodium thiosulfate | Polyvinyl pyrrolidone | — | Sodium metasilicate |
| 709* | 9* | Potassium sulfite | Polyvinyl pyrrolidone | b | — |

TABLE 22

| Exp. No. | Total conc. of (A) + (b-3) + (c-1) +(c-2) + (c-3) (wt. %) | (A):(B-3):(c-1) (c-2):(c-3) (wt. ratio) | Alkaline compound (pH) | Solvent (wt. ratio) |
|---|---|---|---|---|
| 701 | 0.5 | 100:30:100:100:- | NaOH (12.5) | Water:Methanol (70:30) |
| 702 | 0.5 | 100:20:100:100:- | NaOH (12.5) | Water:Dimethyl formamide (95:5) |
| 703 | 0.5 | 100:20:-:100:- | NaOH (12.5) | Water:Methanol (70:30) |
| 704 | 0.5 | 100:10:50:100:- | NaOH (12.5) | Water:Methanol (90:10) |
| 705 | 0.5 | 100:5:50:200:- | NaOH (12.5) | Water:Methanol (90:10) |
| 706 | 0.5 | 100:5:-:-:- | KOH (12.5) | Water:Ethanol (90:10) |
| 707 | 0.5 | 100:10:100:200:- | Ethylene diamine (13.0) | Water:Acetone (90:10) |
| 708 | 0.5 | 100:10:100:-:200 | Ethylene diamine (13.0) | Water:Methanol (90:10) |
| 709* | 0.5 | 100:10:100:300:- | — | Water:Dimethyl formamide (95:5) |

TABLE 23

| Exp. No. | Repetition number of batches | Results of polymerization Polymer scale amount (g/m²) | | Number of fish eyes | Luminosity index (L) |
|---|---|---|---|---|---|
| | | Liquid phase | Around interface between gas and liquid phases | | |
| 701 | 6 | 0 | 11 | 9 | 73.0 |
| 702 | 6 | 0 | 7 | 4 | 73.0 |
| 703 | 5 | 0 | 7 | 6 | 73.0 |
| 704 | 6 | 0 | 7 | 6 | 73.0 |
| 705 | 6 | 0 | 8 | 7 | 73.0 |
| 706 | 5 | 0 | 9 | 8 | 73.0 |
| 707 | 6 | 0 | 9 | 8 | 73.0 |
| 708 | 6 | 0 | 8 | 8 | 73.0 |
| 709* | 2 | 16 | 96 | 40 | 73.0 |

Example 8
(Experiment Nos. 801 to 809)

In each experiment, the same polymerization vessel as that used in Example 2 was used.

In preparing a polymer scale preventive agent in each experiment, the condensation product (A), reducing agent (b-3), water-soluble polymeric compound (c-1), inorganic colloid (c-2) and alkali metal silicate (c-3) set forth in Table 24 as well as the alkaline compound and solvent set forth in Table 25 were used in such amounts as to produce the solvent composition, total concentration of (A)+(b-3)+(c-1)+(c-2)+(c-3), weight ratio of (A):(b-3):(c-1):(c-2):(c-3), and pH shown in Table 25. The scale preventive agent prepared was applied to the inner wall, the stirring shaft, the stirring blades and other areas of the polymerization vessel with which a monomer comes into contact. The preventive agent applied was dried by heating at 40° C. for 15 minutes to form a coating, followed by washing the inside of the polymerization vessel with water.

Thereafter, in each experiment, the process including the polymerization and the washing of the inside of the polymerization vessel with water was repeated batchwise in the same manner as in Example 2, the repetition number of the batches being given in Table 26.

After the final batch was over, in each experiment the amount of polymer scale deposited on areas located in the liquid-phase region and that on areas around the interface between the gas and liquid phases inside the polymerization vessel were determined according to the same method as in Example 1. The results are given in Table 26.

Measurement of the luminosity index (L value) of a sheet formed from a polymer was also carried out with respect to each of the polymers produced in the experiments, according to the same method as in Example 2. The results are given in Table 26.

TABLE 24

| Exp. No. | (A) Condensation product No. | (b-3) Reducing agent | (c-1) Water-soluble polymeric compound | (c-2) Inorganic colloid | (c-3) Alkali metal silicate |
|---|---|---|---|---|---|
| 801 | 1 | Sodium hydrogensulfite Sodium hydrogensulfite | Polyacrylic acid | b | — |
| 802 | 2 | Sodium hydrogensulfite | Polyacrylic acid | b | — |
| 803 | 3 | Sodium hydrogensulfite | — | b | — |
| 804 | 4 | Sodium hydrogensulfite | Sodium alginate | e | — |
| 805 | 5 | Rongalit | Polyvinyl pyrrolidone | f | — |
| 806 | 6 | Sodium bisulfite | Polyvinyl pyrrolidone | g | — |
| 807 | 7 | Hydrogen iodide | — | — | — |
| 808 | 8 | Sodium thiosulfate | Gelatin | — | Water glass |
| 809* | 9* | Sodium sulfite | Polyacrylic acid | b | — |

TABLE 25

| Exp. No. | Total conc. of (A) + (b-3) + (c-1) + (c-2) + (c-3) (wt. %) | (A):(b-3):(c-1): (c-2):(c-3) (wt. ratio) | Alkaline compound (pH) | Solvent (wt. ratio) |
|---|---|---|---|---|
| 801 | 0.5 | 100:30:100:100:- | NaOH (12.5) | Water:Methanol (70:30) |
| 802 | 0.5 | 100:20:100:100:- | NaOH (12.5) | Water:Dimethyl-formamide (95:5) |
| 803 | 0.5 | 100:20:-:100:- | NaOH (12.5) | Water:Methanol (70:30) |
| 804 | 0.5 | 100:10:100:200:- | NaOH (12.5) | Water:Methanol (70:30) |
| 805 | 0.5 | 100:5:100:300:- | NaOH (12.5) | Water:Methanol (70:30) |
| 806 | 0.5 | 100:10:50:100:- | KOH (12.5) | Water:Ethanol (70:30) |
| 807 | 0.5 | 100:10:-:-:- | Ethylene diamine (13.0) | Water:Aceton (70:30) |
| 808 | 0.5 | 100:10:200:-:100 | Ethylene diamine (13.0) | Water:Methanol (70:30) |
| 809* | 0.5 | 100:10:100:100:- | — | Water:Dimethyl-formamide (95:5) |

TABLE 26

| Exp. No. | Repetition number of batches | Results of polymerization Polymer scale amount (g/m²) | | Luminosity index (L) |
|---|---|---|---|---|
| | | Liquid phase | Around interface between gas and liquid phases | |
| 801 | 5 | 0 | 10 | 85.0 |
| 802 | 5 | 0 | 5 | 85.0 |
| 803 | 4 | 0 | 5 | 85.0 |
| 804 | 5 | 0 | 9 | 85.0 |
| 805 | 5 | 0 | 8 | 85.0 |
| 806 | 5 | 0 | 9 | 85.0 |
| 807 | 4 | 0 | 8 | 85.0 |
| 808 | 5 | 0 | 9 | 85.0 |
| 809* | 1 | 25 | 145 | 85.0 |

Example 9
(Experiment Nos. 901 to 909)

In each experiment, the same polymerization vessel as that used in Example 1 was used.

In preparing a polymer scale preventive agent in each experiment, the condensation product (A), aromatic hydroxyl compound (b-4), water-soluble polymeric compound (c-1), inorganic colloid (c-2) and alkali metal silicate (c-3) set forth in Table 27 as well as the alkaline compound and solvent set forth in Table 28 were used in such amounts as to produce the solvent composition, total concentration of (A)+(b-4)+(c-1)+(c-2)+(c-3), weight ratio of (A):(b-4):(c-1):(c-2):(c-3), and pH shown in Table 28. The scale preventive agent prepared was applied to the inner wall, the stirring shaft, the stirring blades and other areas of the polymerization vessel with which a monomer comes into contact. The preventive agent applied was dried by heating at 40° C. for 15 minutes to form a coating, followed by washing the inside of the polymerization vessel with water.

Thereafter, in each experiment, the process including the polymerization and the washing of the inside of polymerization vessel with water was repeated batchwise in the same manner as in Example 1, the repetition number of the batches being given in Table 29.

After the final batch was over, in each experiment, the amount of polymer scale deposited on areas located in the liquid-phase region and that on areas around the interface between the gas and liquid phases inside the polymerization vessel were determined according to the same method as in Example 1. The results are given in Table 29.

Measurement of the luminosity index (L value) of a sheet formed from a polymer was also carried out with respect to each of the polymers produced in the experiments, according to the same method as in Example 1. The results are given in Table 29.

TABLE 27

| Exp. No. | (A) Condensation product No. | (b-4) Aromatic hydroxyl compound | (c-1) Water-soluble polymeric compound | (c-2) Inorganic colloid | (c-3) Alkali metal silicate |
|---|---|---|---|---|---|
| 901 | 1 | Pyrogallol | Gelatin | b | — |
| 902 | 2 | Pyrogallol | Polyacrylic acid | b | — |
| 903 | 3 | Pyrogallol | — | b | — |
| 904 | 4 | Pyrogallol | Polyacrylic acid | c | — |
| 905 | 5 | Resorcinol | Carboxymethyl cellulose | a | — |
| 906 | 6 | Hydroxyhydroquinone | — | — | — |
| 907 | 7 | 2,7-Dihydroxy-naphthalene | Polyvinyl alcohol | d | — |
| 908 | 8 | 1,4-Dihydroxy-naphthalene | Polyvinyl pyrrolidone | — | Sodium metasilicate |
| 909* | 9* | Pyrogallol | Polyvinyl pyrrolidone | b | — |

TABLE 28

| Exp. No. | Total conc. of (A) + (b-4) + (c-1) + (c-2) + (c-3) (wt. %) | (A):(b-4):(c-1):(c-2):(c-3) (wt. ratio) | Alkaline compound (pH) | Solvent (wt. ratio) |
|---|---|---|---|---|
| 901 | 0.5 | 100:30:100:100:- | NaOH (12.5) | Water:Methanol (70:30) |
| 902 | 0.5 | 100:20:100:100:- | NaOH (12.5) | Water:Dimethyl formamide (95:5) |
| 903 | 0.5 | 100:20:-:100:- | NaOH (12.5) | Water:Methanol (70:30) |
| 904 | 0.5 | 100:10:50:100- | NaOH (12.5) | Water:Methanol (90:10) |
| 905 | 0.5 | 100:5:50:200:- | NaOH (12.5) | Water:Methanol (90:10) |
| 906 | 0.5 | 100:5:-:-:- | KOH (12.5) | Water:Ethanol (90:10) |
| 907 | 0.5 | 100:10:100:200:- | Ethylene diamine (13.0) | Water:Acetone (90:10) |
| 908 | 0.5 | 100:10:100:-:200 | Ethylene diamine (13.0) | Water:Methanol (90:10) |
| 909* | 0.5 | 100:10:100:300:- | — | Water:Dimethyl formamide (95:5) |

TABLE 29

| | | Results of polymerization | | |
|---|---|---|---|---|
| Exp. No. | Repetition number of batches | Polymer scale amount (g/m²) | | Luminosity index (L) |
| | | Liquid phase | Around interface between gas and liquid phases | Number of fish eyes | |

| Exp. No. | Repetition number of batches | Liquid phase | Around interface between gas and liquid phases | Number of fish eyes | Luminosity index (L) |
|---|---|---|---|---|---|
| 901 | 6 | 0 | 9 | 7 | 73.0 |
| 902 | 6 | 0 | 5 | 2 | 73.0 |
| 903 | 5 | 0 | 5 | 4 | 73.0 |
| 904 | 6 | 0 | 6 | 4 | 73.0 |
| 905 | 6 | 0 | 6 | 6 | 73.0 |
| 906 | 5 | 0 | 5 | 7 | 73.0 |
| 907 | 6 | 0 | 7 | 7 | 73.0 |
| 908 | 6 | 0 | 8 | 7 | 73.0 |
| 909* | 2 | 16 | 96 | 40 | 73.0 |

Example 10
(Experiment Nos. 1001 to 1009)

In each experiment, the same polymerization vessel as that used in Example 2 was used.

In preparing a polymer scale preventive agent in each experiment, the condensation product (A), aromatic hydroxyl compound (b-4), water-soluble polymeric compound (c-1), inorganic colloid (c-2) and alkali metal silicate (c-3) set forth in Table 30 as well as the alkaline compound and solvent set forth in Table 31 were used in such amounts as to produce the solvent composition, total concentration of (A)+(b-4)+(c-1)+(c-2)+(c-3), weight ratio of (A):(b-4):(c-1):(c-2):(c-3), and pH shown in Table 31. The scale preventive agent prepared was applied to the inner wall, the stirring shaft, the stirring blades and other areas of the polymerization vessel with which a monomer comes into contact. The preventive agent applied was dried by heating at 40° C. for 15 minutes to form a coating, followed by washing the inside of the polymerization vessel with water.

Thereafter, in each experiment, the process including the polymerization and the washing of the inside of polymerization vessel with water was repeated batchwise in the same manner as in Example 2, the repetition number of the batches being given in Table 32.

After the final batch was over, in each experiment, the amount of polymer scale deposited on areas located in the liquid-phase region and that on areas around the interface between the gas and liquid phases inside the polymerization vessel were determined according to the same method as in Example 1. The results are given in Table 32.

Measurement of the luminosity index (L value) of a sheet formed from a polymer was also carried out with respect to each of the polymers produced in the experiments, according to the same method as in Example 2. The results are given in Table 32.

TABLE 30

| Exp. No. | (A) Condensation product No. | (b-4) Aromatic hydroxyl compound | (c-1) Water-soluble polymeric compound | (c-2) Inorganic colloid | (c-3) Alkali metal silicate |
|---|---|---|---|---|---|
| 1001 | 1 | Pyrogallol | Polyacrylic acid | b | — |
| 1002 | 2 | Pyrogallol | Polyacrylic acid | b | — |
| 1003 | 3 | Pyrogallol | — | b | — |
| 1004 | 4 | Pyrogallol | Sodium alginate | e | — |
| 1005 | 5 | Resorcinol | Polyvinyl pyrrolidone | f | — |
| 1006 | 6 | Hydroxyhydroquinone | Polyvinyl Pyrrolidone | g | — |
| 1007 | 7 | 2,7-Dihydroxynaphthalene | — | — | — |
| 1008 | 8 | 1,4-Dihydroxynaphthalene | Gelatin | — | Water glass |
| 1009* | 9* | Pyrogallol | Polyacrylic acid | b | — |

TABLE 31

| Exp. No. | Total conc. of (A) + (b-4) + (c-1) + (c-2) + (c-3) (wt. %) | (A):(b-4):(c-1): (c-2):(c-3) (wt. ratio) | Alkaline compound (pH) | Solvent (wt. ratio) |
|---|---|---|---|---|
| 1001 | 0.5 | 100:30:100:100:- | NaOH (12.5) | Water:Methanol (70:30) |
| 1002 | 0.5 | 100:20:100:100:- | NaOH (12.5) | Water:Dimethyl formamide (95:5) |
| 1003 | 0.5 | 100:20:-:100:- | NaOH (12.5) | Water:Methanol (70:30) |
| 1004 | 0.5 | 100:10:100:200:- | NaOH (12.5) | Water:Methanol (70:30) |
| 1005 | 0.5 | 100:5:100:300:- | NaOH (12.5) | Water:Methanol (70:30) |
| 1006 | 0.5 | 100:10:50:100:- | KOH (12.5) | Water:Ethanol (70:30) |
| 1007 | 0.5 | 100:10:-:-:- | Ethylene diamine (13:0) | Water:Acetone (70:30) |
| 1008 | 0.5 | 100:10:200:-:100 | Ethylene diamine (13.0) | Water:Methanol (70:30) |
| 1009* | 0.5 | 100:10:100:100- | — | Water:Dimethyl formamide (95:5) |

TABLE 32

| Exp. No. | Repetition number of batches | Results of polymerization Polymer scale amount (g/m²) | | Luminosity index (L) |
|---|---|---|---|---|
| | | Liquid phase | Around interface between gas and liquid phases | |
| 1001 | 5 | 0 | 8 | 85.0 |
| 1002 | 5 | 0 | 3 | 85.0 |
| 1003 | 4 | 0 | 3 | 85.0 |
| 1004 | 5 | 0 | 7 | 85.0 |
| 1005 | 5 | 0 | 7 | 85.0 |
| 1006 | 5 | 0 | 7 | 85.0 |
| 1007 | 4 | 0 | 6 | 85.0 |
| 1008 | 5 | 0 | 8 | 85.0 |
| 1009* | 1 | 25 | 145 | 85.0 |

Production Example 2
Production of aromatic hydroxyl compound-acetone condensates Pyrogallol-acetone condensate To an acetone solution containing 200 g of pyrogallol in 1.4 kg of acetone was added 20 g of phosphorus oxychloride, and the resulting mixture was left to stand overnight at room temperature. Thereafter, the mixture was added dropwise to water with stirring, then the resulting precipitate was filtered off and dissolved in a small amount of acetone. The acetone solution thus obtained was poured into a large amount of water, and the resulting precipitate was filtered off and dried, to give a pyrogallol-acetone condensate. The melting point of the condensate was measured to be 200°–210° C.

Resorcinol-acetone condensate

A resorcinol-acetone condensate was produced in the same manner as in the production of the pyrogallol-acetone condensate above, except for using resorcinol in place of pyrogallol. The condensate obtained had a melting point of 170°–180° C.

Production Example 3
Production of aromatic hydroxyl compound-aldehyde compound condensates Phenol-formaldehyde condensate A mixture of 300 g of phenol, 220 g of a 37% aqueous formaldehyde solution (the molar ratio of phenol to formaldehyde being 1:0.85) and 0.3 ml of 35% concentrated hydrochloric acid was heated under reflux at 85° C. for 5 hours with stirring. Thereafter, the reaction mixture obtained was cooled and added dropwise to water with stirring. The resulting precipitate was filtered off and dissolved in a small amount of methanol. The methanol solution thus obtained was poured into a large amount of water, and the resulting precipitate was filtered off and dried to give a phenol-formaldehyde condensate.

Pyrogallol-formaldehyde condensate

A pyrogallol-formaldehyde condensate was produced in the same manner as in the production of the phenol-formaldehyde condensate above, except for using pyrogallol in place of phenol.

2,3-Dihydroxynaphthalene-formaldehyde condensate

A 2,3-dihydroxynaphthalene-formaldehyde condensate was produced in the same manner as in the production of the phenol-formaldehyde condensate, except for using 2,3-dihydroxynaphthalene in place of phenol, using 0.1 ml of phosphoric acid in place of the 35% concentrated hydrochloric acid and adding 100 g of acetone before heating at reflux.

1,4,5,8-Tetrahydroxynaphthalene-formaldehyde condensate

A 1,4,5,8-tetrahydroxynaphthalene-formaldehyde condensate was produced in the same manner as in the production of the 2,3-dihydroxynaphthalene-formaldehyde condensate above, except for using 1,4,5,8-tetrahydroxynaphthalene in place of 2,3-dihydroxynaphthalene.

Production Example 4

Production of condensates of aromatic hydroxyl compound alone 2,7-Dihydroxynaphthalene condensate To a methanol solution containing 50 g of 2,7-dihydroxynaphthalane in 1,000 g of methanol was added 30 g of 30% aqueous hydrogen peroxide, with stirring. The resulting mixture was heated under reflux at 80° C. for 5 hours. Thereafter, the reaction mixture obtained was poured into water, and the resulting precipitate was filtered off and dried to give a 2,7-dihydroxynaphthalene condensate.

Production Example 5

Production of aromatic hydroxyl compound-aromatic amine compound condensates 2,7-Dihydroxynaphthalene-p-aminophenol condensate To 10 liter of acetone were added 50 g of 2,7-dihydroxynaphthalene, 50 g of p-aminophenol and 10 g of periodic acid. The mixture obtained was reacted at 80° C. for 5 hours, and the resulting reaction mixture was cooled to give a solution of 2,7-dihydroxynaphthalene-p-aminophenol condensate in acetone.

Catechol-4-aminodiphenylamine condensate

In 10 liter of methanol were dissolved 50 g of catechol and 50 g of 4-aminodiphenylamine to prepare a solution, to which triethanolamine was added to adjust the pH to 8.0. To the resulting mixture, 30 g of 30% aqueous hydrogen peroxide was added, followed by reaction at 130° C. for 5 hours. The reaction mixture obtained was cooled to give a solution of catechol-4-aminodiphenylamine condensate in methanol.

Example 11

(Experiment Nos. 1101 to 1109)

In each experiment, the same polymerization vessel as that used in Example 1 was used.

In preparing a polymer scale preventive agent in each experiment, the condensation product (A), aromatic hydroxyl compound-based condensate (b-5), water-soluble polymeric compound (c-1), inorganic colloid (c-2) and alkali metal silicate (c-3) set forth in Table 33 as well as the alkaline compound and solvent set forth in Table 34 were used in such amounts as to produce the solvent composition, total concentration of (A)+(b-5)+(c-1)+(c-2)+(c-3), weight ratio of (A):(b-5):(c-1):(c-2):(c-3), and pH shown in Table 34. The scale preventive agent prepared was applied to the inner wall, the stirring shaft, the stirring blades and other areas of the polymerization vessel with which a monomer comes into contact. The preventive agent applied was dried by heating at 40° C. for 15 minutes to form a coating, followed by washing the inside of the polymerization vessel with water.

Thereafter, in each experiment, the process including the polymerization and the washing of the inside of polymerization vessel with water was repeated batchwise in the same manner as in Example 1, the repetition number of the batches being given in Table 35.

After the final batch was over, in each experiment the amount of polymer scale deposited on areas located in the liquid-phase region and that on areas around the interface between the gas and liquid phases inside the polymerization vessel were determined according to the same method as in Example 1. The results are given in Table 35.

Measurement of the luminosity index (L value) of a sheet formed from a polymer was also carried out with respect to each of the polymers produced in the experiments, according to the same method as in Example 1. The results are given in Table 35.

TABLE 33

| Exp. No. | (A) Condensation product No. | (b-5) Aromatic hydroxyl compound-based condensate | (c-1) Water-soluble Polymeric compound | (c-2) Inorganic colloid | (c-3) Alkali metal silicate |
|---|---|---|---|---|---|
| 1101 | 1 | Pyrogallol-acetone condensate | Gelatin | b | — |
| 1102 | 2 | Phenol-formaldehyde condensate | Polyacrylic acid | b | — |
| 1103 | 3 | 2,3-Dihydroxynaphthalene-formaldehyde condensate | — | b | — |
| 1104 | 4 | 2,7-Dihydroxynaphthalene-p-aminophenol condensate | Polyacrylic acid | c | — |
| 1105 | 5 | 2,7-Dihydroxynaphthalene condensate | Carboxymethyl cellulose | a | — |

TABLE 33-continued

| Exp. No. | (A) Condensation product No. | (b-5) Aromatic hydroxyl compound-based condensate | (c-1) Water-soluble Polymeric compound | (c-2) Inorganic colloid | (c-3) Alkali metal silicate |
|---|---|---|---|---|---|
| 1106 | 6 | Wattle tannin | — | — | — |
| 1107 | 7 | Mimosa tannin | Polyvinyl alcohol | d | — |
| 1108 | 8 | Chinese gallotannin | Polyvinyl pyrrolidone | — | Sodium metasilicate |
| 1109* | 9* | Pyrogallol-acetone condensate | Polyvinyl pyrrolidone | b | — |

TABLE 34

| Exp. No. | Total conc. of (A) + (b-5) + (c-1) + (c-2) + (c-3) (wt. %) | (A):(b-5):(c-1): (c-2):(c-3) (wt. ratio) | Alkaline compound (pH) | Solvent (wt. ratio) |
|---|---|---|---|---|
| 1101 | 0.5 | 100:30:100:100:- | NaOH (12.5) | Water:Methanol (70:30) |
| 1102 | 0.5 | 100:20:100:100:- | NaOH (12.5) | Water:Dimethyl formamide (95:5) |
| 1103 | 0.5 | 100:20:-:100:- | NaOH (12.5) | Water:Methanol (70:30) |
| 1104 | 0.5 | 100:10:50:100:- | NaOH (12.5) | Water:Methanol (90:10) |
| 1105 | 0.5 | 100:5:50:200:- | NaOH (12.5) | Water:Methanol (90:10) |
| 1106 | 0.5 | 100:50:-:-:- | KOH (12.5) | Water:Ethanol (90:10) |
| 1107 | 0.5 | 100:10:100:200:- | Ethylene diamine (12.0) | Water:Acetone (90:10) |
| 1108 | 0.5 | 100:10:100:-:200 | Ethylene diamine (12.0) | Water:Methanol (90:10) |
| 1109* | 0.5 | 100:10:100:300:- | — | Water:Dimethyl formamide (95:5) |

TABLE 35

| | | Results of polymerization | | |
|---|---|---|---|---|
| Exp. No. | Repetition number of batches | Polymer scale amount (g/m²) | Number of fish eyes | Luminosity index (L) |
| | | Liquid phase | Around interface between gas and liquid phases | | |
| 1101 | 8 | 0 | 9 | 7 | 73.0 |
| 1102 | 8 | 0 | 5 | 3 | 73.0 |
| 1103 | 7 | 0 | 6 | 5 | 73.0 |
| 1104 | 8 | 0 | 5 | 5 | 73.0 |
| 1105 | 8 | 0 | 6 | 5 | 73.0 |
| 1106 | 6 | 0 | 7 | 6 | 73.0 |
| 1107 | 8 | 0 | 6 | 5 | 73.0 |
| 1108 | 8 | 0 | 6 | 6 | 73.0 |
| 1109* | 2 | 8 | 70 | 30 | 73.0 |

Example 12
(Experiment Nos. 1201 to 1209)

In each experiment, the same polymerization vessel as that used in Example 2 was used.

In preparing a polymer scale preventive agent in each experiment, the condensation product (A), aromatic hydroxyl compound-based condensate (b-5), water-soluble polymeric compound (c-1), inorganic colloid (c-2) and alkali metal silicate (c-3) set forth in Table 36 as well as the alkaline compound and solvent set forth in Table 37 were used in such amounts as to produce the solvent composition, total concentration of (A)+(b-5)+(c-1)+(c-2)+(c-3), weight ratio of (A):(b-5):(c-1):(c-2):(c-3), and pH shown in Table 37. The scale preventive agent prepared was applied to the inner wall, the stirring shaft, the stirring blades and other areas of the polymerization vessel with which a monomer comes into contact. The preventive agent applied was dried by heating at 40° C. for 15 minutes to form a coating, followed by washing the inside of the polymerization vessel with water.

Thereafter, in each experiment, the process including the polymerization and the washing of the inside of polymerization vessel with water was repeated batchwise in the same manner as in Example 2, the repetition number of the batches being given in Table 38.

After the final batch was over, in each experiment the amount of polymer scale deposited on areas located in the liquid-phase region and that on areas around the interface between the gas and liquid phases inside the polymerization vessel were determined according to the same method as in Example 1. The results are given in Table 38.

Measurement of the luminosity index (L value) of a sheet formed from a polymer was also carried out with respect to each of the polymers produced in the experiments, according to the same method as in Example 2. The results are given in Table 38.

TABLE 36

| Exp. No. | (A) Condensation product No. | (b-5) Aromatic hydroxyl compound-based condensate | (c-1) Water-soluble polymeric compound | (c-2) Inorganic colloid | (c-3) Alkali metal silicate |
|---|---|---|---|---|---|
| 1201 | 1 | Resorcinol-acetone condensate | Polyacrylic acid | b | — |
| 1202 | 2 | 1,4,5,7-Tetrahydroxy-naphthalene-formaldehyde condensate | Polyacrylic acid | b | — |
| 1203 | 3 | Catechol-4-amino-diphenylamine condensate | — | b | — |
| 1204 | 4 | Wattle tannin | Sodium alginate | e | — |
| 1205 | 5 | Mimosa tannin | Polyvinyl pyrrolidone | f | — |
| 1206 | 6 | Pyrogallol-acetone condensate | Polyvinyl pyrrolidone | g | — |
| 1207 | 7 | Phenol-formaldehyde condensate | — | — | — |
| 1208 | 8 | Pyrogallol-acetone condensate | Gelatin | — | Water glass |
| 1209* | 9* | Pyrogallol-acetone condensate | Polyacrylic acid | b | — |

TABLE 37

| Exp. No. | Total conc. of (A) + (b-5) + (c-1) + (c-2) + (c-3) (wt. %) | (A):(b-5):(c-1):(c-2):(c-3) (wt. ratio) | Alkaline compound (pH) | Solvent (wt. ratio) |
|---|---|---|---|---|
| 1201 | 0.5 | 100:30:100:100:- | NaOH (12.5) | Water:Methanol (70:30) |
| 1202 | 0.5 | 100:20:100:100:- | NaOH (12.5) | Water:Dimethyl formamide (95:5) |
| 1203 | 0.5 | 100:20:-:100:- | NaOH (12.5) | Water:Methanol (70:30) |
| 1204 | 0.5 | 100:10:100:200:- | NaOH (12.5) | Water:Methanol (70:30) |
| 1205 | 0.5 | 100:5:100:300:- | NaOH (12.5) | Water:Methanol (70:30) |
| 1206 | 0.5 | 100:10:50:100:- | KOH (12.5) | Water:Ethanol (70:30) |
| 1207 | 0.5 | 100:10:-:-:- | Ethylene diamine (12.0) | Water:Acetone (70:30) |
| 1208 | 0.5 | 100:10:200:-:100 | Ethylene diamine (12.0) | Water:Methanol (70:30) |
| 1209* | 0.5 | 100:10:100:100:- | — | Water:Dimethyl formamide (95:5) |

TABLE 38

| Exp. No. | Repetition number of batches | Results of polymerization Polymer scale amount (g/m²) Liquid phase | Around interface between gas and liquid phases | Luminosity index (L) |
|---|---|---|---|---|
| 1201 | 7 | 0 | 8 | 85.0 |
| 1202 | 7 | 0 | 4 | 85.0 |
| 1203 | 5 | 0 | 4 | 85.0 |
| 1204 | 7 | 0 | 7 | 85.0 |
| 1205 | 7 | 0 | 7 | 85.0 |
| 1206 | 7 | 0 | 8 | 85.0 |
| 1207 | 4 | 0 | 7 | 85.0 |
| 1208 | 7 | 0 | 7 | 85.0 |
| 1209* | 1 | 23 | 140 | 85.0 |

Example 13
(Experiment Nos. 1301 to 1307)

A stainless-steel polymerization vessel having an internal capacity of 20 liters and equipped with a stirrer was used to carry out polymerization.

In each experiment, a polymer scale preventive agent (the one which had been used in the experiment corresponding to the parenthesized Exp. No. in Table 39) was applied to the inner wall of the polymerization vessel and to the stirring shaft, stirring blades and the like parts with which monomers come into contact during polymerization. The agent applied was dried by heating at 50° C. for 15 minutes to form a coating, followed by washing with water.

Thereafter, polymerization was carried out as follows. The polymerization vessel provided with the coating as above was charged with 4.0 kg of water and 6 g of sodium dodecylbenzenesulfonate, and temperature was raised to 60° C. with stirring. After the gas phase in the polymerization vessel was replaced with nitrogen gas, the vessel was further charged with 94 g of n-butyl acrylate, 220 g of methyl methacrylate, 5 g of acrylic acid and 5 g of methacrylic acid. Subsequently, 1 g of ammonium persulfate and 1 g of sodium hydrogensulfite were charged into the polymerization vessel, and the resulting mixture in the vessel was stirred at 60° C. for 20 minutes.

Furthermore, into the polymerization vessel were added a monomeric mixture (prepared by mixing 2.1 kg of n-butyl acrylate, 4.8 kg of methyl methacrylate, 100 g of acrylic acid and 100 g of methacrylic acid), 500 g of an aqueous 1 wt.

% ammonium persulfate solution, 500 g of an aqueous 1 wt. % sodium hydrogensulfite solution and 2.0 kg of an aqueous 25 wt. % polyoxyethylene nonyl phenyl ether solution, evenly over a 3-hour period. After the addition was completed, the polymerization vessel was heated to 70° C. and polymerization was carried out for 2 hours.

After the polymerization was over, the resulting polymeric product and unreacted monomers were recovered, and the inside of the vessel was washed with water to remove residual resin.

Thereafter, the above process comprising the formation of the coating through polymerization to the washing of the inside of the polymerization vessel with water was repeated batchwise, the repetition number of the batches being given in Table 39.

After completion of the final batch, in each experiment the amount of polymer scale deposited on areas located in the liquid-phase region and that on areas around the interface between the gas and liquid phases inside the polymerization vessel were measured in the same manner as in Example 1. The results are given in Table 39.

TABLE 39

| Exp. No. | Polymer scale preventive agent (g/m²) | Repetition number of batches | Results of polymerization Polymer scale amount (g/m²) | |
|---|---|---|---|---|
| | | | Liquid phase | Around interface between gas and liquid phases |
| 1301 | 201 | 70 | 0 | 8 |
| 1302 | 401 | 90 | 0 | 15 |
| 1303 | 410 | 100 | 0 | 10 |
| 1304 | 601 | 100 | 0 | 20 |
| 1305 | 801 | 120 | 0 | 28 |
| 1306 | 1001 | 120 | 0 | 26 |
| 1307 | 1201 | 150 | 0 | 25 |

Example 14

A stainless-steel polymerization vessel having an internal capacity of 1,000 liters and equipped with a stirrer was used to carry out polymerization as follows.

The polymer scale preventive agent used in Experiment No. 310 was applied to the inner wall of the polymerization vessel and to the stirring shaft, stirring blades and the like parts with which monomers come into contact during polymerization. The agent applied was dried by heating at 50° C. for 10 minutes to form a coating, followed by washing with water.

Thereafter, the polymerization vessel provided with the coating as above was charged with 400 kg of water, 260 kg of styrene, 140 kg of acrylonitrile, 400 g of partially saponified polyacrylamide and 1.2 kg of α,α'-azobisisobutyronitrile, and polymerization was carried out with stirring at 90° C. for 5 hours. After the polymerization was over, the resulting polymeric product and unreacted monomers were recovered, and the inside of the vessel was washed with water to remove residual resin.

Thereafter, the above process comprising the formation of the coating through polymerization to the washing of the inside of the polymerization vessel with water was repeated batchwise 100 times. Upon the 100th batch, the amount of polymer scale deposited on areas located in the liquid-phase region and that on areas around the interface between the gas and liquid phases inside the polymerization vessel were measured in the same manner as in Example 1. The measured amount of polymer scale was 0 g/m² on the areas in the liquid-phase region and 13 g/m² on the areas around the gas-liquid interface.

Example 15

A stainless-steel polymerization vessel having an internal capacity of 20 liters and equipped with a stirrer was used to carry out polymerization as follows.

The polymer scale preventive agent used in Experiment No. 401 was applied to the inner wall of the polymerization vessel and to the stirring shaft, stirring blades and the like parts with which monomers come into contact during polymerization. The agent applied was dried by heating at 50° C. for 10 minutes to form a coating, followed by washing with water.

Thereafter, the polymerization vessel provided with the coating as above was charged with 9.5 kg of water, 240 g of sodium dodecylbenzenesulfonate, 15 g of t-dodecyl mercaptan, 2.1 kg of butadiene, 2.8 g of methyl methacrylate and 16 g of potassium persulfate, and polymerization was carried out at 60° C. for 10 hours.

After the polymerization was over, the resulting polymeric product and unreacted monomers were recovered, and the inside of the vessel was washed with water to remove residual resin.

Thereafter, the above process comprising the formation of the coating through polymerization to the washing of the inside of the polymerization vessel with water was repeated batchwise 120 times. Upon the 120th batch, the amount of polymer scale deposited on areas located in the liquid-phase region and that on areas around the interface between the gas and liquid phases inside the polymerization vessel were measured in the same manner as in Example 1. The measured amount of polymer scale was 0 g/m² on the areas in the liquid-phase region and 10 g/m² on the areas around the gas-liquid interface.

Example 16

A stainless-steel polymerization vessel having an internal capacity of 100 liters and equipped with a stirrer was used to carry out polymerization as follows.

The polymer scale preventive agent used in Experiment No. 410 was applied to the inner wall of the polymerization vessel and to the stirring shaft, stirring blades and the like parts with which monomers come into contact during polymerization. The agent applied was dried by heating at 50° C. for 15 minutes to form a coating, followed by washing with water.

Thereafter, the polymerization vessel provided with the coating as above was charged with 40 kg of water, 500 g of a disproportionated potassium rosinate, 13 kg of a polybutadiene latex (solids content: 45%), 9 kg of styrene monomer, 5 kg of acrylonitrile monomer, 40 g of t-dodecyl mercaptan and 140 g of cumene hydroperoxide. At a polymerization vessel inside temperature of 47° C, the vessel was charged further with 200 g of grape sugar, 2 g of ferrous sulfate and 100 g of sodium pyrophosphate. Then, polymerization was carried out with stirring at 65° C. for 4 hours.

After the polymerization was over, the resulting polymeric product and unreacted monomers were recovered, and the inside of the vessel was washed with water to remove residual resin.

Thereafter, the above process comprising the formation of the coating through polymerization to the washing of the inside of the polymerization vessel with water was repeated batchwise 120 times. Upon the 120th batch, the amount of polymer scale deposited on areas located in the liquid-phase region and that on areas around the interface between the gas and liquid phases inside the polymerization vessel were measured in the same manner as in Example 1. The measured amount of polymer scale was 0 g/m² on the areas in the liquid-phase region and 7 g/m² on the areas around the gas-liquid interface.

Example 17

A stainless-steel polymerization vessel having an internal capacity of 20 liters and equipped with a stirrer was used to carry out polymerization.

The polymer scale preventive agent used in Experiment No. 701 was applied to the inner wall of the polymerization vessel and to the stirring shaft, stirring blades and the like parts with which monomers come into contact during polymerization. The agent applied was dried by heating at 60° C. for 10 minutes to form a coating, followed by washing with water.

Thereafter, the polymerization vessel provided with the coating as above was charged with 4.5 kg of water, 312 g of a completely saponified polyvinyl alcohol and 6 g of sodium carbonate, and the temperature was raised to 65° C. with stirring. Then, the vessel was further charged with 550 g of vinyl acetate and 550 g of an aqueous 1 wt. % ammonium persulfate solution, and temperature was raised to 80° C. Subsequently, 5.0 kg of vinyl acetate and 1.0 kg of the aqueous 1 wt. % ammonium persulfate solution were added to the polymerization vessel over a 4-hour period so as to achieve uniform mixing of the contents in the vessel. After the addition of the vinyl acetate and ammonium persulfate was over, the temperature inside the vessel was raised to 90° C., and polymerization was carried out at 90° C. for 2 hours.

After the polymerization was over, the resulting polymeric product and unreacted monomers were recovered, and the inside of the vessel was washed with water to remove residual resin.

Thereafter, the above process comprising the formation of the coating through polymerization to the washing of the inside of the polymerization vessel with water was repeated batchwise 120 times. Upon the 120th batch, the amount of polymer scale deposited on areas located in the liquid-phase region and that on areas around the interface between the gas and liquid phases inside the polymerization vessel were measured in the same manner as in Example 1. The measured amount of polymer scale was 0 g/m² on the areas in the liquid-phase region and 8 g/m² on the areas around the gas-liquid interface.

Example 18

A stainless-steel polymerization vessel having an internal capacity of 20 liters and equipped with a stirrer was used to carry out polymerization as follows.

The polymer scale preventive agent used in Experiment No. 801 was applied to the inner wall of the polymerization vessel and to the stirring shaft, stirring blades and the like parts with which monomers come into contact during polymerization. The agent applied was dried by heating at 50° C. for 20 minutes to form a coating, followed by washing with water.

Thereafter, the polymerization vessel provided with the coating as above was charged with 7.0 kg of water, 430 g of a partially saponified polyvinyl alcohol, 7 g of sodium pyrophosphate and 7 g of sodium hydrogensulfite, and the temperature was raised to 50° C. Then, the gas phase in the vessel was replaced with nitrogen gas, the temperature was raised to 70° C., and ethylene was introduced into the vessel until a vessel internal pressure of 14 kg/cm².G was reached. Subsequently, 6.0 kg of vinyl acetate and 1.0 kg of an aqueous 2 wt. % ammonium persulfate solution were added uniformly to the contents of the vessel over a 4-hour period. After the addition of the vinyl acetate and ammonium persulfate was over, the temperature inside the vessel was raised to 80° C., and polymerization was carried out at 80° C. for 3 hours.

After the polymerization was over, the resulting polymeric product and unreacted monomers were recovered, and the inside of the vessel was washed with water to remove residual resin.

Thereafter, the above process comprising the formation of the coating through polymerization to the washing of the inside of the polymerization vessel with water was repeated batchwise 120 times. Upon the 120th batch, the amount of polymer scale deposited on areas located in the liquid-phase region and that on areas around the interface between the gas and liquid phases inside the polymerization vessel were measured in the same manner as in Example 1. The measured amount of polymer scale was 0 g/m² on the areas in the liquid-phase region and 9 g/m² on the areas around the gas-liquid interface.

Example 19

A stainless-steel polymerization vessel having an internal capacity of 20 liters and equipped with a stirrer was used to carry out polymerization as follows.

The polymer scale preventive agent used in Experiment No. 901 was applied to the inner wall of the polymerization vessel and to the stirring shaft, stirring blades and the like parts with which monomers come into contact during polymerization. The agent applied was dried by heating at 60° C. for 20 minutes to form a coating, followed by washing with water.

Thereafter, the polymerization vessel provided with the coating as above was charged with an aqueous solution of 1.2 kg of a polyvinyl alcohol having a saponification degree of 99.4 mol % and a polymerization degree of 2,250 in 15 liters of water. With the aqueous solution being stirred, 1 kg of 35% concentrated hydrochloric acid was added thereto. After the lapse of 10 minutes, 800 g of butyraldehyde was added dropwise into the vessel over a period of 15 minutes. Then, the temperature inside the vessel was raised to 60° C., and polymerization was carried out for 3 hours.

After the polymerization was over, the resulting polymeric product and unreacted monomers were recovered, and the inside of the vessel was washed with water to remove residual resin.

Thereafter, the above process comprising the formation of the coating through polymerization to the washing of the inside of the polymerization vessel with water was repeated batchwise 120 times. Upon the 120th batch, the amount of polymer scale deposited on areas located in the liquid-phase region and that on areas around the interface between the gas and liquid phases inside the polymerization vessel were measured in the same manner as in Example 1. The measured amount of polymer scale was 0 g/m² on the areas in the liquid-phase region and 6 g/m² on the areas around the gas-liquid interface.

Example 20

Preparation of prepolymer

A prepolymer for use in this Example 20 was prepared as follows.

A polymerization vessel was charged with 6,000 g of styrene monomer, 720 g of a polybutadiene rubber, 480 g of a mineral oil (tradename: CP-50, a product by Idemitsu Kosan K.K.) and 6,000 g of n-dodecyl mercaptan, and reaction was carried out at 115° C. for 5 hours to prepare a prepolymer.

A stainless-steel polymerization vessel having an internal capacity of 20 liters and equipped with a stirrer was used to carry out polymerization as follows.

The polymer scale preventive agent used in Experiment No. 1201 was applied to the inner wall of the polymerization vessel and to the stirring shaft, stirring blades and the like parts with which monomers come into contact during polymerization. The agent applied was dried by heating at 50° C. for 15 minutes to form a coating, followed by washing with water.

Thereafter, the polymerization vessel provided with the coating as above was charged with 7,000 g of water, 7,000 g of the prepolymer obtained as above, 70 g of hydroxyapatite, 0.14 g of sodium dodecylbenzenesulfonate, 17.5 g of benzoyl peroxide and 10.5 g of t-butyl perbenzoate. The resulting mixture in the vessel was reacted at 92° C. for 3.5 hours and then at 135° C. for 1 hour, to produce a polymer.

After the polymerization was over, the resulting polymeric product and unreacted monomers were recovered, and the inside of the vessel was washed with water to remove residual resin.

Thereafter, the above process comprising the formation of the coating through polymerization to the washing of the inside of the polymerization vessel with water was repeated batchwise 150 times. Upon the 150th batch, the amount of polymer scale deposited on areas located in the liquid-phase region and that on areas around the interface between gas and liquid phases inside the polymerization vessel were measured in the same manner as in Example 1. The measured amount of polymer scale was 0 g/m² on the areas in the liquid-phase region and 17 g/m² on the areas around the gas-liquid interface.

What is claimed is:

1. A polymer scale preventive agent for use in polymerization of a monomer having an ethylenically unsaturated double bond, comprising an alkaline solution containing:

(A) A condensation product having a molecular weight of 400 to 50,000 obtained by condensing a guinone compound, further comprising (c) at least one member selected from the group consisting of (c-1) a water-soluble polymeric compound, (c-2) an inorganic colloid, and (c-3) and alkali metal silicate, wherein said quinone compound comprises at least one compound selected from the group consisting of:

the compounds having the following formula (1):

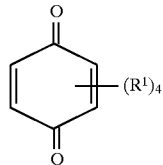

wherein ($R^1$)'s may be the same or different and are each —H, —$NH_2$, —Cl, —Br, —OH, —$NO_2$, —$COCH_3$, —$OCH_3$, —N($CH_3$)$_2$, —COOH, —$SO_3$H or an alkyl group having 1 to 3 carbon atoms;

the compounds having the following formula (2):

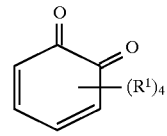

wherein ($R^1$)'s may be the same or different and are each as defined above;

the compounds having the following formula (3):

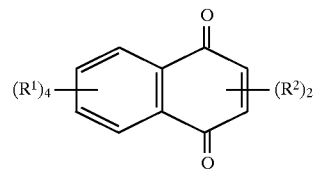

wherein ($R^1$)'s may be the same or different and are each as defined above, and ($R^2$)'s may be the same or different and are each —H, —Cl, —Br, —OH, —$COCH_3$, —$OCH_3$, —$CH_3$, —COOH or —$SO_3$H; and the compounds having the following formula (4):

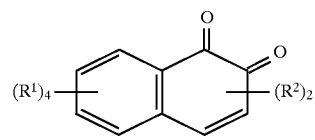

wherein ($R^1$)'s may be the same or different and are each as defined above, and ($R^2$)'s may be the same or different and are each as defined above; and wherein said water soluble polymer compound (c-1) is selected from the group consisting of amphoteric polymeric compounds, anonic polymeric compounds, cationic nitrogen-containing polymeric compounds and hydroxyl-containing polymeric compounds.

2. The agent of claim 1, wherein the condensation product is obtained by condensing only the quinone compound.

3. The agent of claim 1, wherein the condensation product has a molecular weight of 600 to 20,000.

4. The agent of claim 3, wherein the condensation product has a molecular weight of 1,500 to 20,000.

5. The agent of claim 1, wherein the water-soluble polymeric compound is selected from the group consisting of gelatin, casein, polyacrylic acid, carboxymethyl cellulose, polyvinyl pyrrolidone and pectin.

6. The agent of claim 1, wherein the amount of the water-soluble polymeric compound (c-1) is in the range of 1 to 1,000 parts by weight per 100 parts by weight of the component (A).

7. The agent of claim 1, wherein component (C) is an inorganic colloid (c-2) selected from the group consisting of colloids of an oxide, a hydroxide and a mixture thereof, wherein the oxide and the hydroxide are of a metal selected from the group consisting of aluminum, thorium, titanium, zirconium, antimony, tin, and iron; or colloids selected from the group consisting of tungstic acid, vanadium pentoxide, gold and silver, a silver iodide sol or colloids of selenium, sulfur and silica.

8. The agent of claim 1, wherein component (C) is an inorganic colloid, (c-2) selected from the group consisting of a colloid of an oxide, a hydroxide or a mixture thereof, wherein the oxide and hydroxide are of a metal selected from the group consisting of aluminum, titanium, zirconium, tin and iron; or colloidal silica.

9. The agent of claim 7, wherein the amount of the inorganic colloid (c-2) is in the range of 1 to 1,000 parts by weight by 100 parts by weight of component (A).

10. The agent of claim 1, wherein component (C) is an alkali metal silicate (c-3) selected from the group consisting of metasilicates ($M_2SiO_3$), orthosilicates ($M_4SiO_4$), disilicates ($M_2Si_2O_3$), trisilicates ($M_3Si_3O_7$) and sesquisilicates ($M_4Si_3O_{10}$) of the alkali metals lithium, sodium or potassium, wherein M stands for lithium, sodium or potassium; or water glass.

11. The agent of claim 10, wherein the amount of the alkali metal silicate (c-3) is in the range of 1 to 1,000 parts by weight per 100 parts by weight of component (A).

12. The agent of claim 1, wherein component (C) is a combination of the water-soluble polymeric compound (c-1) with the inorganic colloid (c-2) or a combination of the water-soluble polymeric compound (c-1) with the alkali metal silicate (c-3).

13. The agent of claim 12, wherein component (C) is a combination of (c-1) and of (c-2) and the amount of component (c-2) is 5 to 3,000 parts by weight per 100 parts by weight of component (c-1).

14. The agent of claim 12, wherein component (C) is a combination of component (c-1) and of (c-3), and the amount of component (c-3) is 5 to 3,000 parts by weight per 100 parts by weight of component (c-1).

* * * * *

UNITED STATES PATENT AND TRADEMARK OFFICE
CERTIFICATE OF CORRECTION

PATENT NO. : 5,889,103

DATED : March 30, 1999

INVENTOR(S) : Toshihide Shimizu, et al.

It is certified that error appears in the above-identified patent and that said Letters Patent is hereby corrected as shown below:

Column 52, line 39, change "anonic" to --anionic--.

Signed and Sealed this

Twenty-first Day of September, 1999

*Attest:*

Q. TODD DICKINSON

*Attesting Officer*  *Acting Commissioner of Patents and Trademarks*